US012254809B2

(12) United States Patent
Hwang et al.

(10) Patent No.: US 12,254,809 B2
(45) **Date of Patent: *Mar. 18, 2025**

(54) DISPLAY DEVICE AND METHOD OF DRIVING THE SAME

(71) Applicant: SAMSUNG DISPLAY CO., LTD., Yongin-si (KR)

(72) Inventors: Jung Hwan Hwang, Seongnam-si (KR); Hyun Joon Kim, Hwaseong-si (KR); Kye Uk Lee, Seoul (KR); Jun Ki Jeong, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/422,988

(22) Filed: Jan. 25, 2024

(65) Prior Publication Data

US 2024/0161676 A1 May 16, 2024

Related U.S. Application Data

(63) Continuation of application No. 17/810,141, filed on Jun. 30, 2022, now Pat. No. 11,887,525.

(30) Foreign Application Priority Data

Nov. 16, 2021 (KR) ........................ 10-2021-0157661

(51) Int. Cl.
*G09G 3/20* (2006.01)
*G09G 3/32* (2016.01)

(52) U.S. Cl.
CPC ............. *G09G 3/2011* (2013.01); *G09G 3/32* (2013.01); *G09G 2300/0426* (2013.01);
(Continued)

(58) Field of Classification Search
CPC ................... G09G 3/2011; G09G 3/32; G09G 2300/0426; G09G 2300/0819;
(Continued)

(56) References Cited

U.S. PATENT DOCUMENTS 11,887,525 B2 * 1/2024 Hwang ................ G09G 3/2011
2012/0105502 A1 5/2012 Yokoyama et al.
(Continued)

FOREIGN PATENT DOCUMENTS

KR 10-2021-007508 1/2021
KR 10-2021-0087867 7/2021

OTHER PUBLICATIONS

Extended European Search Report dated Jul. 18, 2023 in corresponding EP Application No. 22205728.3.
(Continued)

*Primary Examiner* — Andrew Sasinowski
(74) *Attorney, Agent, or Firm* — F. Chau & Associates, LLC

(57) ABSTRACT

A display device includes PAM data lines receiving PAM and PWM data voltages, and sub-pixels connected to the PAM and PWM data lines. A sub-pixel includes a light emitting element, a first pixel driver to supply a control current according to one of the PAM data voltages to a node, a second pixel driver to generate a driving current according to one of the PWM data voltages, and a third pixel driver to adjust a period during which the driving current is supplied to the light emitting element according to a voltage of the node. A peak current value of the driving current when the sub-pixel emits a light corresponding to a low gray level region is smaller than a peak current value of the driving current when the sub-pixel emits a light corresponding to a high gray level region higher than the low gray level region.

28 Claims, 25 Drawing Sheets

(52) U.S. Cl.
CPC ............... *G09G 2300/0819* (2013.01); *G09G 2310/027* (2013.01); *G09G 2310/08* (2013.01); *G09G 2320/0242* (2013.01)

(58) Field of Classification Search
CPC ......... G09G 2310/027; G09G 2310/08; G09G 2320/0242; H05B 45/325
See application file for complete search history.

(56) References Cited

U.S. PATENT DOCUMENTS

| | | | | |
|---|---|---|---|---|
| 2014/0267456 | A1 | 9/2014 | Ando et al. | |
| 2019/0371232 | A1 | 12/2019 | Kim et al. | |
| 2020/0394953 | A1 | 12/2020 | Kim et al. | |
| 2021/0065614 | A1 | 3/2021 | Kim et al. | |
| 2021/0210003 | A1 | 7/2021 | Kim et al. | |
| 2022/0180801 | A1* | 6/2022 | Kim | G09G 3/32 |
| 2022/0254301 | A1* | 8/2022 | Park | H01L 27/15 |
| 2023/0075434 | A1* | 3/2023 | Jang | H05B 45/325 |
| 2023/0154372 | A1 | 5/2023 | Hwang et al. | |

OTHER PUBLICATIONS

Notice of Allowance dated Jun. 9, 2023 in corresponding U.S. Appl. No. 17/810,141.

* cited by examiner

FIG. 18

| | C1 | C2 | C3 | C4 | C5 | C6 | C7 | C8 | | Cn-1 | Cn |
|---|---|---|---|---|---|---|---|---|---|---|---|
| DATA | 30 | 50 | 110 | 90 | 80 | 85 | 190 | 210 | ••• | 55 | 25 |

| | C1 | C2 | C3 | C4 | C5 | C6 | C7 | C8 | | Cn-1 | Cn |
|---|---|---|---|---|---|---|---|---|---|---|---|
| MDATA | 0 | 0 | 1 | 1 | 1 | 1 | 1 | 1 | ••• | 0 | 0 |

| | C1 | C2 | C3 | C4 | C5 | C6 | C7 | C8 | | Cn-1 | Cn |
|---|---|---|---|---|---|---|---|---|---|---|---|
| CDATA | 90 | 110 | 110 | 90 | 80 | 85 | 190 | 210 | ••• | 115 | 85 |

DISPLAY DEVICE AND METHOD OF DRIVING THE SAME

CROSS-REFERENCE TO RELATED APPLICATION

This U.S. non-provisional patent application is a continuation of U.S. patent application Ser. No. 17/810,141 file Jun. 30, 2022, which claims priority under 35 U.S.C. § 119 to Korean Patent Application No. 10-2021-0157661, filed on Nov. 16, 2021, the disclosures of which are incorporated by reference in their entirety herein.

1. TECHNICAL FIELD

Embodiments of the present disclosure relate to a display device and a method of driving the same.

2. DISCUSSION OF RELATED ART

A display device may be a flat panel display device such as a liquid crystal display, a field emission display and a light emitting display. Such display devices are far lighter and thinner than traditional cathode ray tube display devices.

A light emitting display device may include an organic light emitting display device including an organic light emitting diode as a light emitting element or a light emitting diode display device including an inorganic light emitting diode such as a light emitting diode (LED) as a light emitting element. Since the wavelength of light emitted from the inorganic light emitting diode varies depending on a driving current, an image quality may deteriorate when the luminance or gray level of the light of the inorganic light emitting diode is adjusted by adjusting the magnitude of the driving current applied to the inorganic light emitting diode.

SUMMARY

At least one embodiment of the present disclosure provides a display device with increased image quality even when the wavelength of emitted light changes depending on the driving current applied to an inorganic light emitting diode and a method of driving the same.

According to an embodiment of the present disclosure, a display device including pulse-amplitude modulation (PAM) data lines to which PAM data voltages are respectively applied, pulse-width modulation (PWM) data lines to which PWM data voltages are respectively applied, and a plurality of sub-pixels respectively connected to the PWM data lines and the PAM data lines. A sub-pixel among the plurality of sub-pixels includes a light emitting element, a first pixel driver configured to supply a control current according to one of the PAM data voltages to a first node, a second pixel driver configured to generate a driving current according to any one of the PWM data voltages, and a third pixel driver configured to adjust a period during which the driving current is supplied to the light emitting element according to a voltage of the first node. A peak current value of the driving current when the sub-pixel emits a light corresponding to a low gray level region is smaller than a peak current value of the driving current when the sub-pixel emits a light corresponding to a high gray level region higher than the low gray level region.

In an embodiment, the low gray level region is a black gray level region, and the high gray level region includes a gray level region and a white gray level region.

In an embodiment, the PWM data voltage rise from a first low gray level voltage to a second low gray level voltage in the low gray level region, and rise from a first high gray level voltage to a second high gray level voltage in the high gray level region.

In an embodiment, the second low gray level voltage is greater than the first low gray level voltage.

In an embodiment, the PAM data voltage has a high PAM data voltage in the low gray level region and has a low PAM data voltage lower than the high PAM data voltage in the high gray level region.

According to an embodiment of the present disclosure, a display device includes a display panel, a source driver, a power supply unit, and a digital data converter. The display panel includes PAM data lines, PWM data lines, and a plurality of sub-pixels respectively connected to the PWM data lines and the PAM data lines. The source driver is configured to apply PWM data voltages to the PWM data lines. The power supply unit is configured to apply PAM data voltages to the PAM data lines. The digital data converter is configured to determine digital video data corresponding to a low gray level region among digital video data, and increase a value of the digital video data corresponding to the low gray level region to output converted digital data.

In an embodiment, the display device further includes a timing controller configured to receive the converted digital data from the digital data converter and output the converted digital data and a source control signal to the source driver. The source driver converts the converted digital data into the PWM data voltages.

In an embodiment, the power supply unit outputs one of a high PAM data voltage and a low PAM data voltage to each of the PAM data lines according to a PAM control signal inputted from the digital data converter.

In an embodiment, the high PAM data voltage has a level higher than that of the low PAM data voltage.

In an embodiment, the power supply unit outputs the high PAM data voltage to a first PAM data line among the PAM data lines in response to a first PAM control signal of a first level voltage is inputted, and outputs the low PAM data voltage to the first PAM data line in response to the first PAM control signal of a second level voltage.

In an embodiment, the digital data converter outputs a PAM control signal corresponding to the low gray level region as the first level voltage, and outputs a PAM control signal corresponding to the high gray level region as the second level voltage.

In an embodiment, the low gray level region is a black gray level region, and the high gray level region includes a gray level region and a white gray level region.

In an embodiment, a peak current value of a driving current when one of the sub-pixels emits a light corresponding to a low gray level region is smaller than a peak current value of the driving current when the sub-pixel emits a light corresponding to a high gray level region higher than the low gray level region.

In an embodiment, the PWM data voltage rises from a first low gray level voltage to a second low gray level voltage in the low gray level region, and rises from a first high gray level voltage to a second high gray level voltage in the high gray level region.

In an embodiment, the second low gray level voltage is greater than the first low gray level voltage.

According to an embodiment of the present disclosure, a method of driving a display device includes: determining digital video data corresponding to a low gray level region among digital video data, outputting modulated digital data by increasing a value of the digital video data of the low gray level region, outputting a PAM control signal corresponding to the low gray level region as a first level voltage and outputting a PAM control signal corresponding to a high gray level region other than the low gray level region as a second level voltage, generating PWM data voltages according to the modulated digital video data and outputting the PWM data voltages to PWM data lines, and outputting PAM data voltages to PAM data lines according to the PAM control signal.

In an embodiment, the outputting of the PAM data voltages to the PAM data lines according to the PAM control signal includes outputting one of a high PAM data voltage and a low PAM data voltage to each of the PAM data lines according to the PAM control signal.

In an embodiment, the outputting of the PAM data voltages to the PAM data lines according to the PAM control signal includes outputting the high PAM data voltage to a first PAM data line among the PAM data lines when a first PAM control signal of a first level voltage is inputted, and outputting the low PAM data voltage to the first PAM data line when a first PAM control signal of a second level voltage is inputted.

In an embodiment, the PWM data voltage rises from a first low gray level voltage to a second low gray level voltage in the low gray level region, and rises from a first high gray level voltage to a second high gray level voltage in the high gray level region.

In an embodiment, the second low gray level voltage is greater than the first low gray level voltage.

According to an embodiment of the present disclosure, a display device includes a plurality of sub-pixels. Each sub-pixel includes a light emitting element, a first pixel driver, a second pixel driver, and a third pixel driver. The first pixel driver is configured to supply a control current to a first node according to a pulse-amplitude modulation (PAM) data voltage received from a first data line. The second pixel driver is configured to generate a driving current according to a pulse-width modulation (PWM) data voltage received from a second other data line. The third pixel driver is configured to adjust a period during which the driving current is supplied to the light emitting element according to a voltage of the first node. The peak current value of the driving current when the light-emitting element emits light for image data having a gray level between a first level and a second level is smaller than a peak current value of the driving current when the light-emitting element emits light for image data having a gray level region between the second level and a third level higher than the first level. In an embodiment, the first level is 0 and the third level is a maximum gray level supported by the display device.

In a display device and a driving method according to at least one embodiment, luminance of light emitted from an inorganic light emitting diode is controlled by adjusting a period in which a driving current is applied while maintaining the driving current applied to the inorganic light emitting diode at a constant level. Therefore, it is possible to reduce or prevent deterioration of an image quality due to a change in wavelength of the emitted light depending on the driving current applied to the inorganic light emitting diode.

Further, in a display device and a driving method according to at least one embodiment, it is possible to make the peak current value of the driving current constant or to reduce variation in the peak current value in a low gray level region by increasing the period in which the driving current is applied to the light emitting element instead of lowering the magnitude of the peak current value of the driving current in the low gray level region. Therefore, it is possible to prevent or reduce a change in color coordinates of an image displayed by a display panel in the low gray level region due to the variation in the peak current value of the driving current in the low gray level region. Further, it is possible to prevent or reduce the variation in the light emitting efficiency of each of sub-pixels of the display panel depending on the driving current in the low gray level region.

BRIEF DESCRIPTION OF THE DRAWINGS

The above and other features of the present disclosure will become more apparent by describing in detail embodiments thereof, with reference to the accompanying drawings, in which:

FIG. 18 is an exemplary diagram showing digital video data, low gray level map data, and modulated digital data of one horizontal line;

DETAILED DESCRIPTION OF THE EMBODIMENTS

Figure 1:
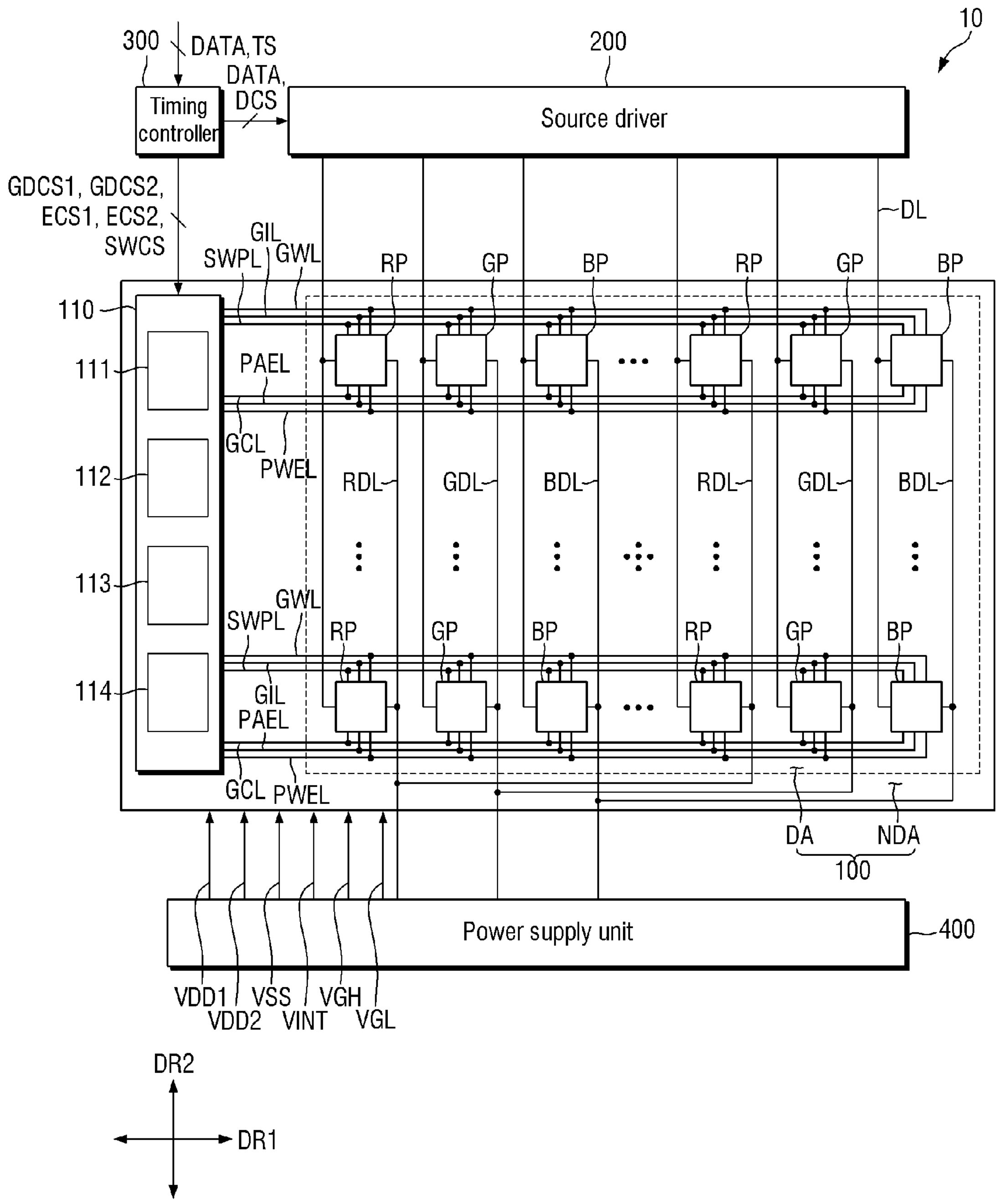
FIG. 1 is a block diagram illustrating a display device according to an embodiment.

Embodiments of the present disclosure will be described more fully hereinafter with reference to the accompanying drawings. Like reference numerals may refer to like elements throughout the specification and the accompanying drawings.

Herein, when two or more elements or values are described as being substantially the same as or about equal to each other, it is to be understood that the elements or values are identical to each other, the elements or values are equal to each other within a measurement error, or if measurably unequal, are close enough in value to be functionally equal to each other as would be understood by a person having ordinary skill in the art. For example, the term "about" as used herein is inclusive of the stated value and means within an acceptable range of deviation for the particular value as determined by one of ordinary skill in the art, considering the measurement in question and the error associated with measurement of the particular quantity (e.g., the limitations of the measurement system). For example, "about" may mean within one or more standard deviations as understood by one of the ordinary skill in the art. Further, it is to be understood that while parameters may be described herein as having "about" a certain value, according to exemplary embodiments, the parameter may be exactly the certain value or approximately the certain value within a measurement error as would be understood by a person having ordinary skill in the art. Other uses of these terms and similar terms to describe the relationship between components should be interpreted in a like fashion.

It will be understood that when a component, such as a film, a region, a layer, or an element, is referred to as being "on", "connected to", "coupled to", or "adjacent to" another component, it can be directly on, connected, coupled, or adjacent to the other component, or intervening components may be present. It will also be understood that when a component is referred to as being "between" two components, it can be the only component between the two components, or one or more intervening components may also be present. It will also be understood that when a component is referred to as "covering" another component, it can be the only component covering the other component, or one or more intervening components may also be covering the other component. Other words use to describe the relationship between elements may be interpreted in a like fashion.

It will be further understood that descriptions of features or aspects within each embodiment are available for other similar features or aspects in other embodiments, unless the context clearly indicates otherwise. Accordingly, all features and structures described herein may be mixed and matched in any desirable manner.

As used herein, the singular forms "a", "an" and "the" are intended to include the plural forms as well, unless the context clearly indicates otherwise.

Spatially relative terms, such as "below", "lower", "above", "upper", etc., may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" other elements or features would then be oriented "above" the other elements or features. Thus, the term "below" may encompass both an orientation of above and below.

When a feature is said to extend, protrude, or otherwise follow a certain direction, it will be understood that the feature may follow said direction in the negative, i.e., opposite direction. Accordingly, the feature is not limited to follow exactly one direction, and may follow along an axis formed by the direction, unless the context clearly indicates otherwise.

FIG. 1 is a block diagram illustrating a display device according to an embodiment.

Referring to FIG. 1, a display device 10 includes a display panel 100, a scan driver 110 (e.g., a gate driver or driver circuit), a source driver 200 (e.g., a driver circuit), a timing controller (e.g., a control circuit) 300, and a power supply unit (e.g., a power supply or power supply circuit) 400.

A display area DA of the display panel 100 may include sub-pixels RP, GP, and BP for displaying an image, scan write lines GWL connected to the sub-pixels RP, GP, and BP, scan initialization lines GIL, scan control lines GCL, sweep signal lines SWPL, pulse-width-modulation (PWM) emission lines PWEL, pulse-amplitude modulation (PAM) emission lines PAEL, PWM data lines DL, first PAM data lines RDL, second PAM data lines GDL, and third PAM data lines BDL. For example, the RP sub-pixels may output red colored light, the GP sub-pixels may be output green colored light, and the BP sub-pixels may output blue colored light, but embodiments of the inventive concept are not limited thereto.

The scan write lines GWL, the scan initialization lines GIL, the scan control lines GCL, the sweep signal lines SWPL, the PWM emission lines PWEL, and the PAM emission lines PAEL may extend in a first direction (X-axis direction), and may be disposed in a second direction (Y-axis direction) intersecting the first direction (X-axis direction). The PWM data lines DL, the first PAM data lines RDL, the second PAM data lines GDL, and the third PAM data lines BDL may extend in the second direction (Y-axis direction), and may be disposed in the first direction (X-axis direction). The first PAM data lines RDL may be electrically connected to each other, the second PAM data lines GDL may be electrically connected to each other, and the third PAM data lines BDL may be electrically connected to each other.

The sub-pixels RP, GP, and BP may include first sub-pixels RP emitting first light, second sub-pixels GP emitting second light, and third sub-pixels BP emitting third light. The first light may indicate light of a red wavelength band, the second light may indicate light of a green wavelength band, and the third light may indicate light of a blue wavelength band. For example, the main peak wavelength of the first light may be within a range of about 600 nm to about 750 nm, the main peak wavelength of the second light may be within a range of about 480 nm to about 560 nm, and the main peak wavelength of the third light may be within a range of about 370 nm to about 460 nm.

Each of the sub-pixels RP, GP, and BP may be connected to any one of the scan write lines GWL, any one of the scan initialization lines GIL, any one of the scan control lines GCL, any one of the sweep signal lines SWPL, any one of the PWM emission lines PWEL, and any one of the PAM emission lines PAEL. Further, each of the first sub-pixels RP may be connected to any one of the PWM data lines DL and any one of the first PAM data lines RDL. Further, each of the second sub-pixels GP may be connected to any one of the PWM data lines DL and any one of the second PAM data lines GDL. Further, each of the third sub-pixels BP may be connected to any one of the PWM data lines DL and any one of the third PAM data lines BDL.

In a non-display area NDA of the display panel 100, a scan driver 110 for applying signals to the scan write lines GWL, the scan initialization lines GIL, the scan control lines GCL, the sweep signal lines SPWL, the PWM emission lines PWEL, and the PAM emission lines PAEL may be disposed. The non-display area NDA may surround the display area DA. In an embodiment, none of the sub-pixels RP, GP, and BP are present in the non-display area NDA. Although FIG. 1 illustrates that the scan driver 110 is disposed at one edge of the display panel 100, the present disclosure is not limited thereto. The scan driver 110 may be disposed at both edges of the display panel 100. For example, the scan driver 110 may be implemented by first and a second driver circuits, where the first driver circuit is disposed on a first edge of the display panel 100 and the second driver circuit is disposed on a second other edge of the display panel 100, which may be opposite to the first edge. For example, the first driver circuit could drive odd line while the second driver circuit drives even lines, or vice versa.

The scan driver 110 may include a first scan signal driver 111, a second scan signal driver 112, a sweep signal driver 113, and an emission signal driver 114.

The first scan signal driver 111 may receive a first scan driving control signal GDCS1 from the timing controller 300. The first scan signal driver 111 may output scan initialization signals to the scan initialization lines GIL in response to the first scan driving control signal GDCS1, and may output scan write signals to the scan write lines GWL. That is, the first scan signal driver 111 may output two types of scan signals, i.e., the scan initialization signals and the scan write signals.

The second scan signal driver 112 may receive a second scan driving control signal GDCS2 from the timing controller 300. The second scan signal driver 112 may output scan control signals to the scan control lines GCL in response to the second scan driving control signal GDCS2.

The sweep signal driver 113 may receive a first emission control signal ECS1 and a sweep control signal SWCS from the timing controller 300. The sweep signal driver 113 may output PWM emission signals to the PWM emission lines PWEL in response to the first emission control signal ECS1, and may output sweep signals to the sweep signal lines SWPL. That is, the sweep signal driver 113 may output the PWM emission signals and the sweep signals.

The emission signal output unit 114 may receive a second emission control signal ECS2 from the timing controller 300. The emission signal output unit 114 may output PAM emission signals to the PAM emission lines PAEL in response to the second emission control signal ECS2.

The timing controller 300 receives digital video data DATA and timing signals TS. The timing controller 300 may generate a scan timing control signal for controlling the operation timing of the scan driver 110 in response to the timing signals TS. The timing controller 300 may generate from the scan timing control signal, the first scan driving control signal GDCS1, the second scan driving control signal GDCS2, the first emission control signal ECS1, the second emission control signal ECS2, and the sweep control signal SWCS. Further, the timing controller 300 may generate a source control signal DCS for controlling the operation timing of the source driver 200.

The timing controller 300 outputs the first scan driving control signal GDCS1, the second scan driving control signal GDCS2, the first emission control signal ECS1, the second emission control signal ECS2, and the sweep control signal SWCS to the scan driver 110. The timing controller 300 outputs the digital video data DATA and the source control signal DCS to the source driver 200.

The source driver 200 converts the digital video data DATA into analog PWM data voltages and outputs the analog PWM data voltages to the PWM data lines DL. Accordingly, the sub-pixels SP may be selected by the scan write signals of the scan driver 110, and the PWM data voltages may be supplied to the selected sub-pixels RP, GP, and BP.

The power supply unit 400 may commonly output a first PAM data voltage to the first PAM data lines RDL, commonly output a second PAM data voltage to the second PAM data lines GDL, and commonly output a third PAM data voltage to the third PAM data lines BDL. Further, the power supply unit 400 may generate a plurality of power voltages and output them to the display panel 100.

The power supply unit 400 may output a first power voltage VDD1, a second power voltage VDD2, a third power voltage VSS, an initialization voltage VINT, a gate-on voltage VGL, and a gate-off voltage VGH to the display panel 100. The first power voltage VDD1 and the second power voltage VDD2 may be a high potential driving voltage for driving the light emitting element of each of the sub-pixels RP, GP, and BP. The initialization voltage VINT may be a low potential driving voltage for driving the light emitting element of each of the sub-pixels RP, GP, and BP. The initialization voltage VINT and the gate-off voltage VGH may be applied to each of the sub-pixels RP, GP, and BP, and the gate-on voltage VGL and the gate-off voltage VGH may be applied to the scan driver 110.

Each of the source driver 200, the timing controller 300, and the power supply unit 400 may be formed of an integrated circuit. Further, the source driver 200 may be formed of a plurality of integrated circuits.

Figure 2:
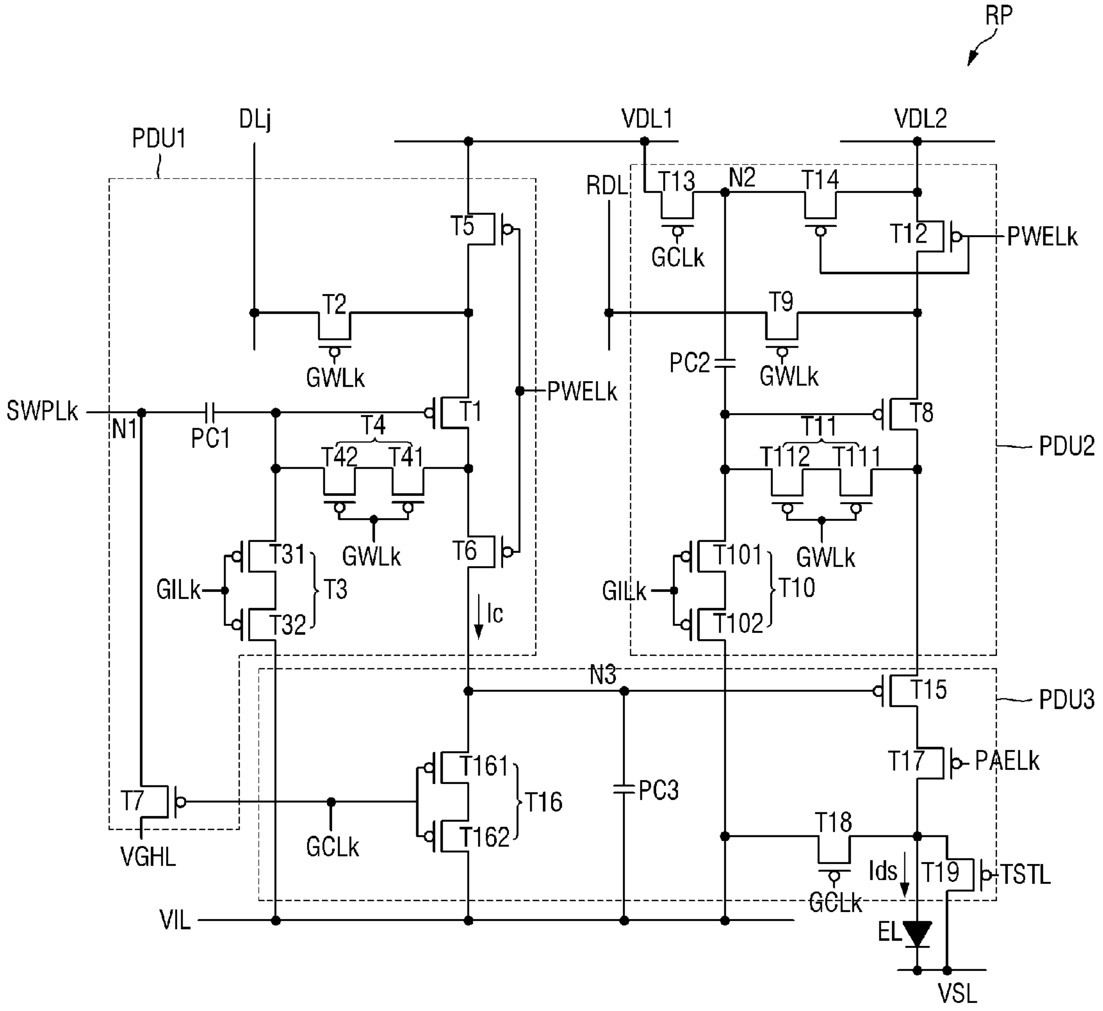
FIG. 2 is a circuit diagram illustrating a first sub-pixel according to an embodiment.

FIG. 2 is a circuit diagram illustrating a first sub-pixel according to an embodiment.

Referring to FIG. 2, the first sub-pixel RP according to an embodiment may be connected to a $k^{th}$ (k being a positive integer) scan write line GWLk, a $k^{th}$ scan initialization line GILk, a $k^{th}$ scan control line GCLk, a $k^{th}$ sweep signal line SWPLk, a $k^{th}$ PWM emission line PWELk, and a $k^{th}$ PAM emission line PAELk. Further, the first sub-pixel RP may be connected to a $j^{th}$ PWM data line DLj and the first PAM data line RDL. Further, the first sub-pixel RP may be connected to the first power line VDL1 to which the first power voltage VDD1 is applied, the second power line VDL2 to which the second power voltage VDD2 is applied, the third power line VSL to which the third power voltage VSS is applied, the initialization voltage line VIL to which the initialization voltage VINT is applied, and the gate-off voltage line VGHL to which the gate-off voltage VGH is applied. For simplicity of description, the $j^{th}$ PWM data line DLj may be referred to as a first data line, and the first PAM data line RDL may be referred to as a second data line.

The first sub-pixel RP may include the light emitting element EL, the first pixel driver PDU1, the second pixel driver PDU2, and the third pixel driver PDU3.

The light emitting element EL emits light in response to a driving current Ids generated by the second pixel driver PDU2. The light emitting element EL may be disposed between the seventeenth transistor T17 and the third power line VSL. The first electrode of the light emitting element EL may be connected to the second electrode of the seventeenth transistor T17, and the second electrode thereof may be connected to the third power line VSL. The first electrode of the light emitting element EL may be an anode electrode and the second electrode thereof may be a cathode electrode. The light emitting element EL may be an inorganic light emitting element including a first electrode, a second electrode, and an inorganic semiconductor disposed between the first electrode and the second electrode. For example, the light emitting element EL may be a micro light emitting diode formed of an inorganic semiconductor, but is not limited thereto.

The first pixel driver PDU1 generates a control current Ic in response to a $j^{th}$ PWM data voltage of the $j^{th}$ PWM data line DLj to control the voltage of a third node N3 of the third pixel driver PDU3. Since the pulse width of the driving current Ids flowing through the light emitting element EL may be adjusted by the control current Ic of the first pixel driver PDU1, the first pixel driver PDU1 may be a pulse width modulation (PWM) unit for performing pulse width modulation of the driving current Ids flowing through the light emitting element EL.

The first pixel driver PDU1 may include the first to seventh transistors T1 to T7 and the first capacitor PC1.

The first transistor T1 controls the control current Ic flowing between the second electrode and the first electrode in response to the PWM data voltage applied to the gate electrode.

The second transistor T2 is turned on by a $k^{th}$ scan write signal of the $k^{th}$ scan write line GWLk to supply the PWM data voltage of the $j^{th}$ PWM data line DLj to the first electrode of the first transistor T1. The gate electrode of the second transistor T2 may be connected to the $k^{th}$ scan write line GWLk, the first electrode thereof may be connected to the $j^{th}$ PWM data line DLj, and the second electrode thereof may be connected to the first electrode of the first transistor T1.

The third transistor T3 is turned on by a $k^{th}$ scan initialization signal of the $k^{th}$ scan initialization line GILk to connect the initialization voltage line VIL to the gate electrode of the first transistor T1. Accordingly, during the turn-on period of the third transistor T3, the gate electrode of the first transistor T1 may be discharged to the initialization voltage VINT of the initialization voltage line VIL. In this case, the gate-on voltage VGL of the $k^{th}$ scan initialization signal may be different from the initialization voltage VINT of the initialization voltage line VIL. In particular, since the difference voltage between the gate-on voltage VGL and the initialization voltage VINT is greater than the threshold voltage of the third transistor T3, the third transistor T3 may be stably turned on even after the initialization voltage VINT is applied to the gate electrode of the first transistor T1. Therefore, when the third transistor T3 is turned on, the initialization voltage VINT may be stably applied to the gate electrode of the first transistor T1 regardless of the threshold voltage of the third transistor T3.

The third transistor T3 may include a plurality of transistors connected in series. For example, the third transistor T3 may include a first sub-transistor T31 and a second sub-transistor T32. Accordingly, it is possible to prevent the voltage of the gate electrode of the first transistor T1 from leaking through the third transistor T3. The gate electrode of the first sub-transistor T31 may be connected to the $k^{th}$ scan initialization line GILk, the first electrode thereof may be connected to the gate electrode of the first transistor T1, and the second electrode thereof may be connected to the first electrode of the second sub-transistor T32. The gate electrode of the second sub-transistor T32 may be connected to the $k^{th}$ scan initialization line GILk, the first electrode thereof may be connected to the second electrode of the first sub-transistor T31, and the second electrode thereof may be connected to the initialization voltage line VIL.

The fourth transistor T4 is turned on by the $k^{th}$ scan write signal of the $k^{th}$ scan write line GWLk to connect the gate electrode and the second electrode of the first transistor T1. Accordingly, during the turn-on period of the fourth transistor T4, the first transistor T1 may operate as a diode.

The fourth transistor T4 may include a plurality of transistors connected in series. For example, the fourth transistor T4 may include a third sub-transistor T41 and a fourth sub-transistor T42. Accordingly, it is possible to prevent the voltage of the gate electrode of the first transistor T1 from leaking through the fourth transistor T4. The gate electrode of the third sub-transistor T41 may be connected to the $k^{th}$ scan write line GWLk, the first electrode thereof may be connected to the second electrode of the first transistor T1, and the second electrode thereof may be connected to the first electrode of the fourth sub-transistor T42. The gate electrode of the fourth sub-transistor T42 may be connected to the $k^{th}$ scan write line GWLk, the first electrode thereof may be connected to the second electrode of the third sub-transistor T41, and the second electrode thereof may be connected to the gate electrode of the first transistor T1.

The fifth transistor T5 is turned on by the $k^{th}$ PWM emission signal of the $k^{th}$ PWM emission line PWELk to connect the first electrode of the first transistor T1 to the first power line VDL1. The gate electrode of the fifth transistor T5 may be connected to the $k^{th}$ PWM emission line PWELk, the first electrode thereof may be connected to the first power line VDL1, and the second electrode thereof may be connected to the first electrode of the first transistor T1.

The sixth transistor T6 is turned on by the $k^{th}$ PWM emission signal of the $k^{th}$ PWM emission line PWELk to connect the second electrode of the first transistor T1 to the third node N3 of the third pixel driver PDU3. The gate electrode of the sixth transistor T6 may be connected to the $k^{th}$ PWM emission line PWELk, the first electrode thereof may be connected to the second electrode of the first transistor T1, and the second electrode thereof may be connected to the third node N3 of the third pixel driver PDU3.

The seventh transistor T7 is turned on by the $k^{th}$ scan control signal of the $k^{th}$ scan control line GCLk to supply the gate-off voltage VGH of the gate-off voltage line VGHL to the first node N1 connected to the $k^{th}$ sweep signal line SWPLk. Accordingly, it is possible to prevent the change in the voltage of the gate electrode of the first transistor T1 from being reflected in a $k^{th}$ sweep signal of the $k^{th}$ sweep signal line SWPLk by the first capacitor PC1 during the period in which the initialization voltage VINT is applied to the gate electrode of the first transistor T1 and the period in which the PWM data voltage of the $j^{th}$ PWM data line DLj and a threshold voltage Vth1 of the first transistor T1 are programmed. The gate electrode of the seventh transistor T7 may be connected to the $k^{th}$ scan control line GCLk, the first electrode thereof may be connected to the gate-off voltage line VGHL, and the second electrode thereof may be connected to the first node N1.

The first capacitor PC1 may be disposed between the gate electrode of the first transistor T1 and the first node N1. One electrode of the first capacitor PC1 may be connected to the gate electrode of the first transistor T1, and the other electrode thereof may be connected to the first node N1.

The first node N1 may be the contact point of the $k^{th}$ sweep signal line SWPLk, the second electrode of the seventh transistor T7, and the other electrode of the first capacitor PC1.

The second pixel driver PDU2 generates the driving current Ids applied to the light emitting element EL in response to the first PAM data voltage of the first PAM data line RDL. The second pixel driver PDU2 may be a pulse amplitude modulation (PAM) unit for performing pulse amplitude modulation. The second pixel driver PDU2 may be a constant current generator for generating a constant driving current Ids in response to the first PAM data voltage.

Further, the second pixel driver PDU2 of each of the first sub-pixels RP may receive the same first PAM data voltage regardless of the luminance of the first sub-pixel RP to generate the same driving current Ids. Similarly, the second pixel driver PDU2 of each of the second sub-pixels GP may receive the same second PAM data voltage regardless of the luminance of the second sub-pixel GP to generate the same driving current Ids. The third pixel driver PDU3 of each of the third sub-pixels BP may receive the same third PAM data voltage regardless of the luminance of the third sub-pixel BP to generate the same driving current Ids.

The second pixel driver PDU2 may include eighth to fourteenth transistors T8 to T14 and a second capacitor PC2.

The eighth transistor T8 controls the driving current Ids flowing to the light emitting element EL in response to the voltage applied to the gate electrode.

The ninth transistor T9 is turned on by the $k^{th}$ scan write signal of the $k^{th}$ scan write line GWLk to supply the first PAM data voltage of the first PAM data line RDL to the first electrode of the eighth transistor T8. The gate electrode of the eighth transistor T8 may be connected to the $k^{th}$ scan write line GWLk, the first electrode thereof may be connected to the first PAM data line RDL, and the second electrode thereof may be connected to the first electrode of the eighth transistor T1.

The tenth transistor T10 is turned on by the $k^{th}$ scan initialization signal of the $k^{th}$ scan initialization line GILk to connect the initialization voltage line VIL to the gate electrode of the eighth transistor T8. Accordingly, during the turn-on period of the tenth transistor T10, the gate electrode of the eighth transistor T8 may be discharged to the initialization voltage VINT of the initialization voltage line VIL. In this case, the gate-on voltage VGL of the $k^{th}$ scan initialization signal may be different from the initialization voltage VINT of the initialization voltage line VIL. In particular, since the difference voltage between the gate-on voltage VGL and the initialization voltage VINT is greater than the threshold voltage of the tenth transistor T10, the tenth transistor T10 may be stably turned on even after the initialization voltage VINT is applied to the gate electrode of the eighth transistor T8. Therefore, when the tenth transistor T10 is turned on, the initialization voltage VINT may be stably applied to the gate electrode of the eighth transistor T8 regardless of the threshold voltage of the tenth transistor T10.

The tenth transistor T10 may include a plurality of transistors connected in series. For example, the tenth transistor T10 may include a fifth sub-transistor T101 and a sixth sub-transistor T102. Accordingly, the voltage of the gate electrode of the eighth transistor T8 may be prevented from leaking through the tenth transistor T10. The gate electrode of the fifth sub-transistor T101 may be connected to the $k^{th}$ scan initialization line GILk, the first electrode thereof may be connected to the gate electrode of the eighth transistor T8, and the second electrode thereof may be connected to the first electrode of the sixth sub-transistor T102. The gate electrode of the sixth sub-transistor T102 may be connected to the $k^{th}$ scan initialization line GILk, the first electrode thereof may be connected to the second electrode of the fifth sub-transistor T101, and the second electrode thereof may be connected to the initialization voltage line VIL.

The eleventh transistor T11 is turned on by the $k^{th}$ scan write signal of the $k^{th}$ scan write line GWLk to connect the gate electrode and the second electrode of the eighth transistor T8. Accordingly, during the turn-on period of the eleventh transistor T11, the eighth transistor T8 may operate as a diode.

The eleventh transistor T11 may include a plurality of transistors connected in series. For example, the eleventh transistor T11 may include a seventh sub-transistor T111 and an eighth sub-transistor T112. Accordingly, it is possible to prevent the voltage of the gate electrode of the eighth transistor T8 from leaking through the eleventh transistor T11. The gate electrode of the seventh sub-transistor T111 may be connected to the $k^{th}$ scan write line GWLk, the first electrode thereof may be connected to the second electrode of the eighth transistor T8, and the second electrode thereof may be connected to the first electrode of the eighth sub-transistor T112. The gate electrode of the eighth sub-transistor T112 may be connected to the $k^{th}$ scan write line GWLk, the first electrode thereof may be connected to the second electrode of the seventh sub-transistor T111, and the second electrode thereof may be connected to the gate electrode of the eighth transistor T8.

The twelfth transistor T12 is turned on by the $k^{th}$ PWM emission signal of the $k^{th}$ PWM emission line PWELk to connect the first electrode of the eighth transistor T8 to the second power line VDL2. The gate electrode of the twelfth transistor T12 may be connected to the $k^{th}$ PWM emission line PWELk, the first electrode thereof may be connected to the first power line VDL1, and the second electrode thereof may be connected to the first electrode of the eighth transistor T8.

The thirteenth transistor T13 is turned on by the $k^{th}$ scan control signal of the $k^{th}$ scan control line GCLk to connect the first power line VDL1 to the second node N2. The gate electrode of the thirteenth transistor T13 may be connected to the $k^{th}$ scan control line GCLk, the first electrode thereof may be connected to the first power line VDL1, and the second electrode thereof may be connected to the second node N2.

The fourteenth transistor T14 is turned on by the $k^{th}$ PWM emission signal of the $k^{th}$ PWM emission line PWELk to connect the second power line VDL2 to the second node N2. Accordingly, when the fourteenth transistor T14 is turned on, the second power voltage VDD2 of the second power line VDL2 may be supplied to the second node N2. The gate electrode of the fourteenth transistor T14 may be connected to the $k^{th}$ PWM emission line PWELk, the first electrode thereof may be connected to the second power line VDL2, and the second electrode thereof may be connected to the second node N2.

The second capacitor PC2 may be disposed between the gate electrode of the eighth transistor T8 and the second node N2. One electrode of the second capacitor PC2 may be connected to the gate electrode of the eighth transistor T8, and the other electrode thereof may be connected to the second node N2.

The second node N2 may be the contact point of the second electrode of the thirteenth transistor T13, the second electrode of the fourteenth transistor T14, and the other electrode of the second capacitor PC2.

The third pixel driver PDU3 adjusts the period in which the driving current Ids is applied to the light emitting element EL in response to the voltage of the third node N3.

The third pixel driver PDU3 may include fifteenth to nineteenth transistors T15 to T19 and a third capacitor PC3.

The fifteenth transistor T15 is turned on or turned off depending on the voltage of the third node N3. When the fifteenth transistor T15 is turned on, the driving current Ids of the eighth transistor T8 may be supplied to the light emitting element EL, and when the fifteenth transistor T15 is turned off, the driving current Ids of the eighth transistor T8 is not supplied to the light emitting element EL. Therefore, the turn-on period of the fifteenth transistor T15 may be substantially the same as the emission period of the light emitting element EL. The gate electrode of the fifteenth transistor T15 may be connected to the third node N3, the first electrode thereof may be connected to the second electrode of the eighth transistor T8, and the second electrode thereof may be connected to the first electrode of the seventeenth transistor T17.

The sixteenth transistor T16 is turned on by the $k^{th}$ scan control signal of the $k^{th}$ scan control line GCLk to connect the initialization voltage line VIL to the third node N3. Accordingly, during the turn-on period of the sixteenth transistor T16, the third node N3 may be discharged to the initialization voltage of the initialization voltage line VIL.

The sixteenth transistor T16 may include a plurality of transistors connected in series. For example, the sixteenth transistor T16 may include a ninth sub-transistor T161 and a tenth sub-transistor T162. Accordingly, it is possible to prevent the voltage of the third node N3 from leaking through the sixteenth transistor T16. The gate electrode of the ninth sub-transistor T161 may be connected to the $k^{th}$ scan control line GCLk, the first electrode thereof may be connected to the third node N3, and the second electrode thereof may be connected to the first electrode of the tenth sub-transistor T162. The gate electrode of the tenth sub-transistor T162 may be connected to the $k^{th}$ scan control line GCLk, the first electrode thereof may be connected to the second electrode of the ninth sub-transistor T161, and the second electrode thereof may be connected to the initialization voltage line VIL.

The seventeenth transistor T17 is turned on by the $k^{th}$ PAM emission signal of the $k^{th}$ PAM emission line PAELk to connect the second electrode of the fifteenth transistor T15 to the first electrode of the light emitting element EL. The gate electrode of the seventeenth transistor T17 may be connected to the $k^{th}$ PAM emission line PAELk, the first electrode thereof may be connected to the second electrode of the fifteenth transistor T15, and the second electrode thereof may be connected to the first electrode of the light emitting element EL.

The eighteenth transistor T18 is turned on by the $k^{th}$ scan control signal of the $k^{th}$ scan control line GCLk to connect the initialization voltage line VIL to the first electrode of the light emitting element EL. Accordingly, during the turn-on period of the eighteenth transistor T18, the first electrode of the light emitting element EL may be discharged to the initialization voltage of the initialization voltage line VIL. The gate electrode of the eighteenth transistor T18 may be connected to the $k^{th}$ scan control line GCLk, the first electrode thereof may be connected to the first electrode of the light emitting element EL, and the second electrode thereof may be connected to the initialization voltage line VIL.

The nineteenth transistor T19 is turned on by the test signal of the test signal line TSTL to connect the first electrode of the light emitting element EL to the third power line VSL. The gate electrode of the nineteenth transistor T19 may be connected to the test signal line TSTL, the first electrode thereof may be connected to the first electrode of the light emitting element EL, and the second electrode thereof may be connected to the third power line VSL.

The third capacitor PC3 may be disposed between the third node N3 and the initialization voltage line VIL. One electrode of the third capacitor PC3 may be connected to the third node N3, and the other electrode thereof may be connected to the initialization voltage line VIL.

The third node N3 may be the contact point of the second electrode of the sixth transistor T6, the gate electrode of the fifteenth transistor T15, the first electrode of the ninth sub-transistor T161, and one electrode of the third capacitor PC3.

Any one of the first electrode and the second electrode of each of the first to nineteenth transistors T1 to T19 may be a source electrode, and the other may be a drain electrode. The active layer of each of the first to nineteenth transistors T1 to T19 may be formed of any one of polysilicon, amorphous silicon, and an oxide semiconductor. When the active layer of each of the first to nineteenth transistors T1 to T19 is polysilicon, it may be formed by a low temperature poly silicon (LTPS) process.

Further, although FIG. 2 mainly describes the case in which each of the first to nineteenth transistors T1 to T19 is formed as a P-type metal-oxide-semiconductor field-effect transistor (MOSFET), embodiments of this specification are not limited thereto. For example, each of the first to nineteenth transistors T1 to T19 may be formed as an N-type MOSFET.

Alternatively, in an embodiment, to increase the black display capability of the light emitting element EL by blocking a leakage current, in the first sub-pixel RP, the first sub-transistor T31 and the second sub-transistor T32 of the third transistor T3, the third sub-transistor T41 and the fourth sub-transistor T42 of the fourth transistor T4, the fifth sub-transistor T101 and the sixth sub-transistor T102 of the tenth transistor T10, and the seventh sub-transistor T111 and the eighth sub-transistor T112 of the eleventh transistor T11 may be formed as the N-type MOSFETs. In this case, the gate electrode of the third sub-transistor T41 and the gate electrode of the fourth sub-transistor T42 of the fourth transistor T4, and the gate electrode of the seventh sub-transistor T111 and the gate electrode of the eighth sub-transistor T112 of the eleventh transistor T11 may be connected to the $k^{th}$ control signal GNLk. A $k^{th}$ scan initialization signal GIk and the k$^{th}$ control signal GNLk may have a pulse generated by the gate-off voltage VGH. Further, the active layers of the first sub-transistor T31 and the second sub-transistor T32 of the third transistor T3, the third sub-transistor T41 and the fourth sub-transistor T42 of the fourth transistor T4, the fifth sub-transistor T101 and the sixth sub-transistor T102 of the tenth transistor T10, and the seventh sub-transistor T111 and the eighth sub-transistor T112 of the eleventh transistor T11 may be formed of an oxide semiconductor, and the active layers of the other transistors may be formed of polysilicon.

Alternatively, in an embodiment, any one of the first sub-transistor T31 and the second sub-transistor T32 of the third transistor T3 may be formed as the N-type MOSFET and the other may be formed as the P-type MOSFET. In this case, between the first sub-transistor T31 and the second sub-transistor T32 of the third transistor T3, the transistor formed as the N-type MOSFET may be formed of an oxide semiconductor, and the transistor formed as the P-type MOSFET may be formed of polysilicon.

Alternatively, in an embodiment, any one of the third sub-transistor T41 and the fourth sub-transistor T42 of the fourth transistor T4 may be formed as the N-type MOSFET, and the other may be formed as the P-type MOSFET. In this case, between the third sub-transistor T41 and the fourth sub-transistor T42 of the fourth transistor T4, the transistor formed as the N-type MOSFET may be formed of an oxide semiconductor, and the transistor formed as the P-type MOSFET may be formed of polysilicon.

Alternatively, in an embodiment, any one of the fifth sub-transistor T101 and the sixth sub-transistor T102 of the tenth transistor T10 may be formed as the N-type MOSFET, and the other may be formed as the P-type MOSFET. In this case, between the fifth sub-transistor T101 and the sixth sub-transistor T102 of the tenth transistor T10, the transistor formed as the N-type MOSFET may be formed of an oxide semiconductor, and the transistor formed as the P-type MOSFET may be formed of polysilicon.

Alternatively, in an embodiment, any one of the seventh sub-transistor T111 and the eighth sub-transistor T112 of the eleventh transistor T11 may be formed as the N-type MOSFET, and the other may be formed as the P-type MOSFET. In this case, between the seventh sub-transistor T111 and the eighth sub-transistor T112 of the eleventh transistor T11, the transistor formed as the N-type MOSFET may be formed of an oxide semiconductor, and the transistor formed as the P-type MOSFET may be formed of polysilicon.

The second sub-pixel GP and the third sub-pixel BP according to an embodiment may be substantially the same as the first sub-pixel RP described in conjunction with FIG. 2. Therefore, the description of the second sub-pixel GP and the third sub-pixel BP according to an embodiment will be omitted.

Figure 3:
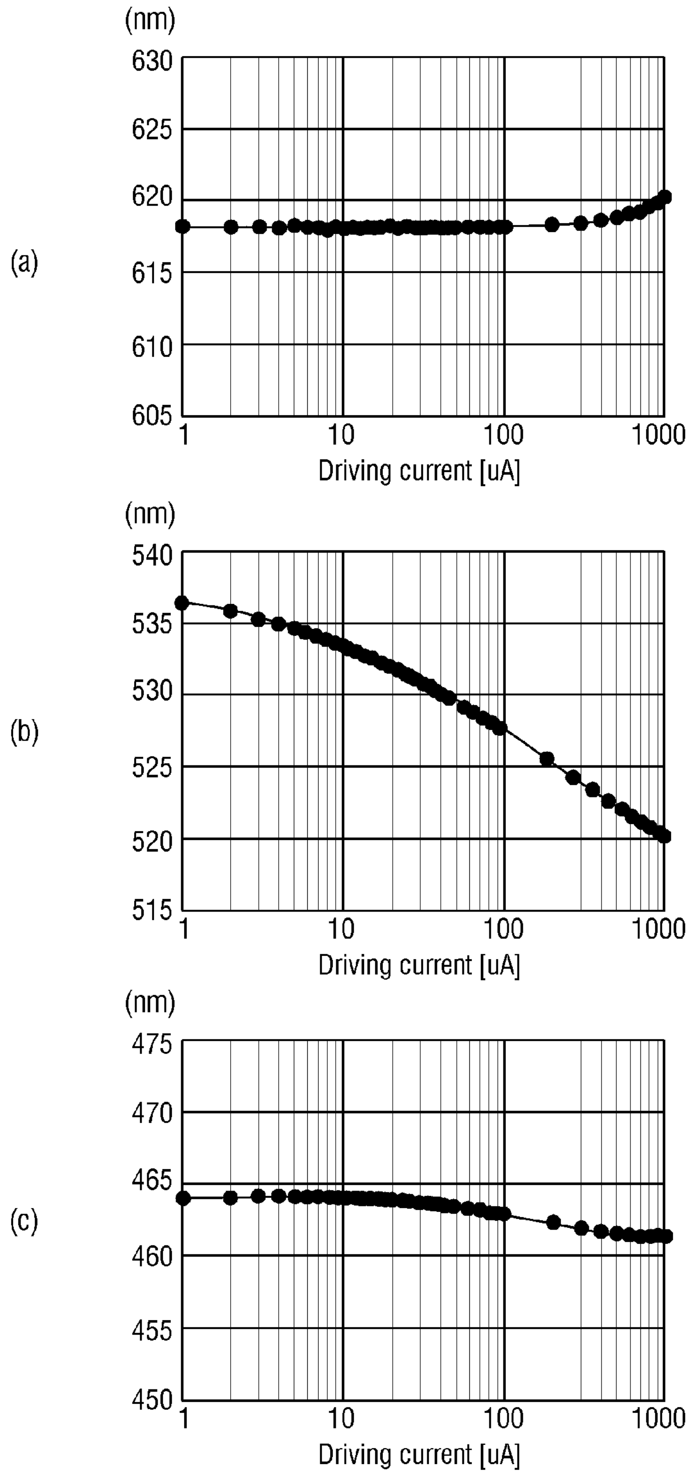
FIG. 3 shows graphs illustrating the wavelength of light emitted from the light emitting element of a first sub-pixel, the wavelength of light emitted from the light emitting element of a second sub-pixel, and the wavelength of light emitted from the light emitting element of a third sub-pixel in response to a driving current according to an embodiment, respectively.

FIG. 3 shows graphs illustrating the wavelength of light emitted from the light emitting element of a first sub-pixel, the wavelength of light emitted from the light emitting element of a second sub-pixel, and the wavelength of light emitted from the light emitting element of a third sub-pixel in response to a driving current according to an embodiment, respectively.

In FIG. 3, (a) shows the wavelength of the light emitted from the light emitting element EL of the first sub-pixel RP in response to the driving current Ids applied to the light emitting element EL of the first sub-pixel RP in the case where the light emitting element EL of the first sub-pixel RP includes an inorganic material, e.g., Gallium Nitride (GaN). In FIG. 3, (b) shows the wavelength of the light emitted from the light emitting element EL of the second sub-pixel GP in response to the driving current Ids applied to the light emitting element EL of the second sub-pixel GP in the case where the light emitting element EL of the second sub-pixel GP includes an inorganic material, e.g., GaN. In FIG. 3, (c) shows the wavelength of the light emitted from the light emitting element EL of the third sub-pixel BP in response to the driving current Ids applied to the light emitting element EL of the third sub-pixel BP in the case where the light emitting element EL of the third sub-pixel BP includes an inorganic material, e.g., GaN. In each of the graphs of (a), (b), and (c) of FIG. 3, the X-axis represents the driving current Ids, and the Y-axis represents the wavelength of the light emitted from the light emitting element.

Referring to FIG. 3, when the driving current Ids applied to the light emitting element EL of the first sub-pixel RP is 1 μA to 300 μA, the wavelength of the light emitted from the light emitting element EL of the first sub-pixel RP is constant at about 618 nm. As the driving current Ids applied to the light emitting element EL of the first sub-pixel RP increases from 300 μA to 1000 μA, the wavelength of the light emitted from the light emitting element EL of the first sub-pixel RP increases from about 618 nm to about 620 nm.

As the driving current Ids applied to the light emitting element EL of the second sub-pixel GP increases from 1 μA to 1000 μA, the wavelength of the light emitted from the light emitting element EL of the second sub-pixel GP decreases from about 536 nm to about 520 nm.

As the driving current Ids applied to the light emitting element EL of the third sub-pixel BP increases from 1 μA to 1000 μA, the wavelength of the light emitted from the light emitting element EL of the third sub-pixel BP decreases from about 464 nm to about 461 nm.

In summary, the wavelength of the light emitted from the light emitting element EL of the first sub-pixel RP and the wavelength of the light emitted from the light emitting element EL of the third sub-pixel BP are hardly changed even when the driving current Ids is changed. On the contrary, the wavelength of the light emitted from the light emitting element EL of the second sub-pixel GP is in inverse proportion to the driving current Ids. Therefore, in the case of adjusting the driving current Ids applied to the light emitting element EL of the second sub-pixel GP, the wavelength of the light emitted from the light emitting element EL of the second sub-pixel GP may be changed, and the color coordinates of the image displayed by the display panel 100 may be changed.

Figure 4:
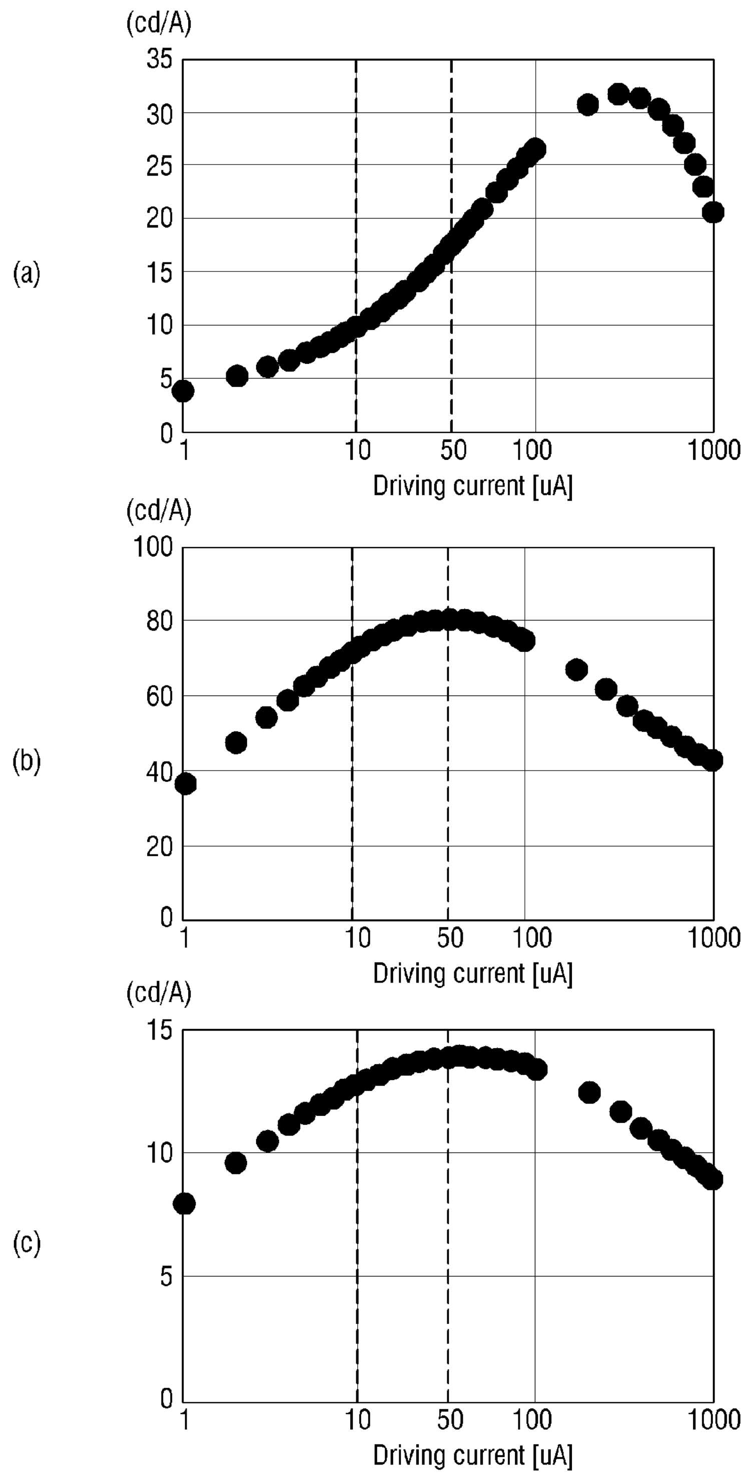
FIG. 4 shows graphs illustrating the light emitting efficiency of the light emitting element of a first sub-pixel, the light emitting efficiency of the light emitting element of a second sub-pixel, and the light emitting efficiency of the light emitting element of a third sub-pixel in response to a driving current according to an embodiment, respectively.

FIG. 4 shows graphs illustrating the light emitting efficiency of the light emitting element of a first sub-pixel, the light emitting efficiency of the light emitting element of a second sub-pixel, and the light emitting efficiency of the light emitting element of a third sub-pixel in response to a driving current according to one embodiment, respectively.

In FIG. 4, (a) illustrates the light emitting efficiency of the light emitting element EL of the first sub-pixel RP in response to the driving current Ids applied to the light emitting element EL of the first sub-pixel RP in the case where the light emitting element EL of the first sub-pixel RP is formed of an inorganic material, (b) illustrates the light emitting efficiency of the light emitting element EL of the second sub-pixel GP in response to the driving current Ids applied to the light emitting element EL of the second sub-pixel GP in the case where the light emitting element EL of the second sub-pixel GP is formed of an inorganic material, and (c) illustrates the light emitting efficiency of the light emitting element EL of the third sub-pixel BP in response to the driving current Ids applied to the light emitting element EL of the third sub-pixel BP in the case where the light emitting element EL of the third sub-pixel BP is formed of an inorganic material.

Referring to FIG. 4, when the driving current Ids applied to the light emitting element EL of the first sub-pixel RP is 10 μA, the light emitting efficiency of the light emitting element EL of the first sub-pixel RP is approximately 8.5 cd/A. When the driving current Ids applied to the light emitting element EL of the first sub-pixel RP is 50 μA, the light emitting efficiency of the light emitting element EL of the first sub-pixel RP is approximately 18 cd/A. That is, when the driving current Ids applied to the light emitting element EL of the first sub-pixel RP is 50 μA, the light emitting efficiency is increased by approximately 2.1 times compared to when it is 10 μA.

When the driving current Ids applied to the light emitting element EL of the second sub-pixel GP is 10 μA, the light emitting efficiency of the light emitting element EL of the second sub-pixel GP is approximately 72 cd/A. When the driving current Ids applied to the light emitting element EL of the second sub-pixel GP is 50 μA, the light emitting efficiency of the light emitting element EL of the second sub-pixel GP is approximately 80 cd/A. That is, when the driving current Ids applied to the light emitting element EL of the second sub-pixel GP is 50 μA, the light emitting efficiency is increased by approximately 1.1 times compared to when it is 10 μA.

When the driving current Ids applied to the light emitting element EL of the third sub-pixel BP is 10 μA, the light emitting efficiency of the light emitting element EL of the third sub-pixel BP is approximately 14 cd/A. When the driving current Ids applied to the light emitting element EL of the third sub-pixel BP is 50 μA, the light emitting efficiency of the light emitting element EL of the third sub-pixel BP is approximately 13.2 cd/A. That is, when the driving current Ids applied to the light emitting element EL of the third sub-pixel BP is 50 μA, the light emitting efficiency is increased by approximately 1.06 times compared to when it is 10 μA.

In summary, the light emitting efficiency of the light emitting element of the first sub-pixel RP, the light emitting efficiency of the light emitting element of the second sub-pixel GP, and the light emitting efficiency of the third sub-pixel BP may vary depending on the driving current Ids.

As shown in FIGS. 3 and 4, when the driving current Ids applied to the light emitting element EL of the second sub-pixel GP is adjusted, the color coordinates of the image displayed by the display panel 100 may be changed. Further, the light emitting efficiency of the light emitting element of the first sub-pixel RP, the light emitting efficiency of the light emitting element of the second sub-pixel GP, and the light emitting efficiency of the third sub-pixel BP may vary depending on the driving current Ids. Therefore, it is beneficial to maintain the color coordinates of the image displayed by the display panel 100 at constant values, to maintain the driving current Ids in each of the first sub-pixel RP, the second sub-pixel GP, and the third sub-pixel BP at a constant level so that the light emitting element EL of the first sub-pixel RP, the light emitting element EL of the second sub-pixel GP, and the light emitting element EL of the third sub-pixel BP have an optimal light emitting efficiency, and to adjust the luminance of each of the first sub-pixel RP, the second sub-pixel GP, and the third sub-pixel BP by adjusting the period in which the driving current Ids is applied.

That is, as shown in FIG. 2, the second pixel driver PDU2 of the first sub-pixel RP generates the driving current Ids so that the light emitting element EL of the first sub-pixel RP is driven with the optimal light emitting efficiency in response to the first PAM data voltage of the first PAM data line RDL. The first pixel driver PDU1 of the first sub-pixel RP generates the control current Ic in response to the PWM data voltage of the PWM data line to control the voltage of the third node N3 of the third pixel driver PDU3, and the third pixel driver PDU3 thereof adjusts the period in which the driving current Ids is applied to the light emitting element EL in response to the voltage of the third node N3. Therefore, in the first sub-pixel RP, it is possible to generate a constant driving current Ids so that the light emitting element thereof is driven with the optimal light emitting efficiency, and also possible to adjust the luminance of the light emitted from the light emitting element EL by adjusting the duty ratio of the light emitting element EL, i.e., the period in which the driving current Ids is applied to the light emitting element EL.

Further, the second pixel driver PDU2 of the second sub-pixel GP generates the driving current Ids so that the light emitting element EL of the second sub-pixel GP is driven with the optimal light emitting efficiency in response to the second PAM data voltage of the second PAM data line GDL. The first pixel driver PDU1 of the second sub-pixel GP generates the control current Ic in response to the PWM data voltage of the PWM data line to control the voltage of the third node N3 of the third pixel driver PDU3, and the third pixel driver PDU3 thereof adjusts the period in which the driving current Ids is applied to the light emitting element EL in response to the voltage of the third node N3. Therefore, in the second sub-pixel GP, it is possible to generate a constant driving current Ids so that the light emitting element thereof is driven with the optimal light emitting efficiency, and also possible to adjust the luminance of the light emitted from the light emitting element EL by adjusting the duty ratio of the light emitting element EL, i.e., the period in which the driving current Ids is applied to the light emitting element EL.

Further, the second pixel driver PDU2 of the third sub-pixel BP generates the driving current Ids so that the light emitting element EL of the third sub-pixel BP is driven with the optimal light emitting efficiency in response to the third PWM data voltage of the third PAM data line BDL. The first pixel driver PDU1 of the third sub-pixel BP generates the control current Ic in response to the PWM data voltage of the PWM data line to control the voltage of the third node N3 of the third pixel driver PDU3, and the third pixel driver PDU3 thereof adjusts the period in which the driving current Ids is applied to the light emitting element EL in response to the voltage of the third node N3. Therefore, in the third sub-pixel BP, it is possible to generate a constant driving current Ids so that the light emitting element thereof is driven with the optimal light emitting efficiency, and also possible to adjust the luminance of the light emitted from the light emitting element EL by adjusting the duty ratio of the light emitting element EL, i.e., the period in which the driving current Ids is applied to the light emitting element EL.

Therefore, it is possible to reduce or prevent deterioration of an image quality due to the change in the wavelength of the emitted light depending on the driving current applied to the light emitting element EL. Further, each of the light emitting element EL of the first sub-pixel RP, the light emitting element EL of the second sub-pixel GP, and the light emitting element EL of the third sub-pixel BP may emit light with the optimal light emitting efficiency.

Figure 5:
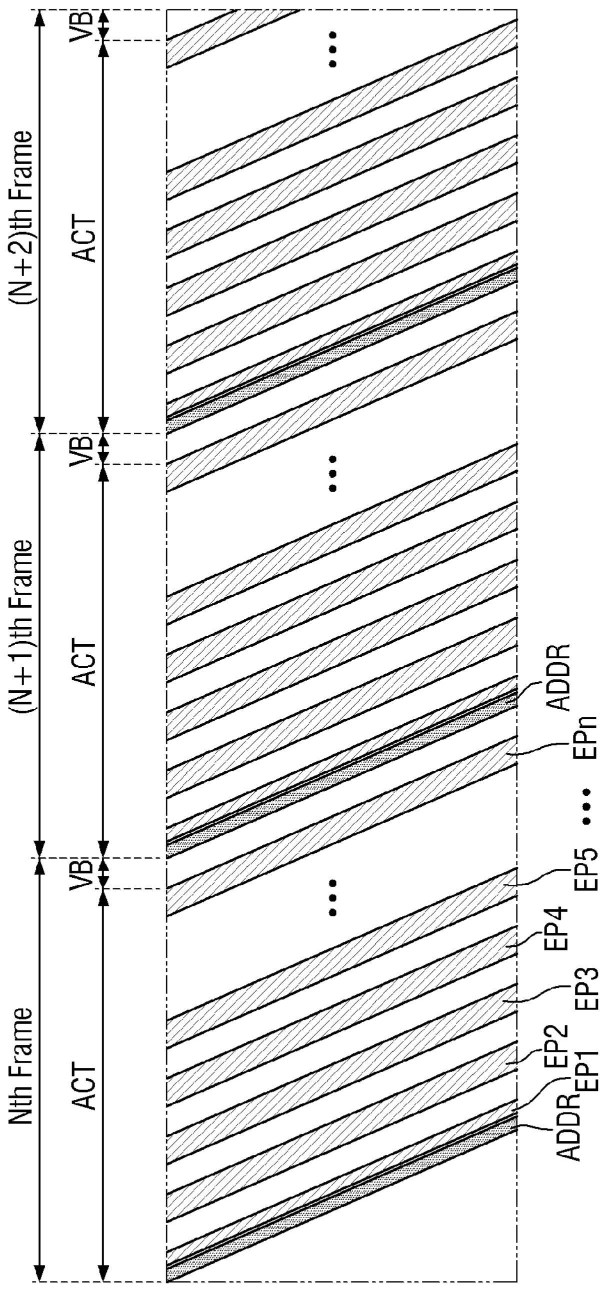
FIG. 5 shows an example of the operation of a display device during $N^{th}$ to $(N+2)^{th}$ frame periods.

FIG. 5 shows an example of the operation of a display device during $N^{th}$ to $(N+2)^{th}$ frame periods.

Referring to FIG. 5, each of the $N^{th}$ to $(N+2)^{th}$ frame periods may include an active period ACT and a blank period VB. The active period ACT may include a data address period ADDR in which the PWM data voltage and first/second/third PWM data voltages are supplied to each of the first to third sub-pixels RP, GP, and BP, and a plurality of emission periods EP1, EP2, EP3, EP4, EP5, . . . , EPn in which the light emitting element EL of each of the sub-pixels SP emits light. The blank period VB may be the period in which the sub-pixels RP, GP, and BP of the display panel 100 are idle. For example, the sub-pixels RP, GP, and BP may not emit light during the blank period VB. In FIG. 5, the x-axis may represent time divided into frame periods and the y-axis may represent the pixel rows of the display panel 100. For example, the highest point on the y-axis may correspond to the first pixel row and the lowest point on the y-axis may corresponds to the last pixel row.

The address period ADDR and the first emission period EP1 may be shorter than each of the second to $n^{th}$ emission periods EP2, EP3, EP4, EP5, . . . , EPn. For example, the address period ADDR and the first emission period EP1 may be about 5 horizontal periods, and each of the second to $n^{th}$ emission periods EP2, EP3, EP4, EP5, . . . , EPn may be about 12 horizontal periods, but embodiments of this specification are not limited thereto. In an embodiment, a single horizontal period may be a period during which one row of pixels is driven. Further, the active period ACT may include 25 emission periods, but the number of emission periods EP1, EP2, EP3, EP4, EP5, . . . , EPn of the active period ACT is not limited thereto.

The PWM data voltage and the first/second/third PWM data voltages may be sequentially inputted to the sub-pixels RP, GP, and BP of the display panel 100 for each row line during the address period ADDR. For example, the PWM data voltage and the first/second/third PWM data voltages may be sequentially inputted to the sub-pixels RP, GP, and BP in the order from the sub-pixels RP, GP, and BP disposed on a first row line to the sub-pixels RP, GP, and BP disposed on an $n^{th}$ row line that is a last row line.

The sub-pixels RP, GP, and BP of the display panel 100 may sequentially emit light for each row line in each of the plurality of emission periods EP1, EP2, EP3, EP4, EP5, . . . , EPn. For example, the sub-pixels RP, GP, and BP may sequentially emit light in the order from the sub-pixels RP, GP, and BP disposed on the first row line to the sub-pixels RP, GP, and BP disposed on the last row line.

The address period ADDR may overlap at least one of the emission periods EP1, EP2, EP3, EP4, . . . , EPn. For example, as shown in FIG. 5, the address period ADDR may overlap the first to third emission periods EP1, EP2, and EP3. In this case, when the sub-pixels RP, GP, and BP disposed on a $p^{th}$ (p being a positive integer) row line receive the PWM data voltage and the first/second/third PWM data voltages, the sub-pixels RP, GP, and BP disposed on a $q^{th}$ (q being a positive integer smaller than p) row line may emit light.

Further, each of the emission periods EP1, EP2, EP3, EP4, . . . , EPn may overlap emission periods adjacent thereto. For example, the second emission period EP2 may overlap the first emission period EP1 and the third emission period EP3. In this case, the sub-pixels RP, GP, and BP disposed on the $p^{th}$ row line may emit light in the second emission period EP2, whereas the sub-pixels RP, GP, and BP disposed on the $q^{th}$ row line may emit light in the first emission period EP1.

Figure 6:
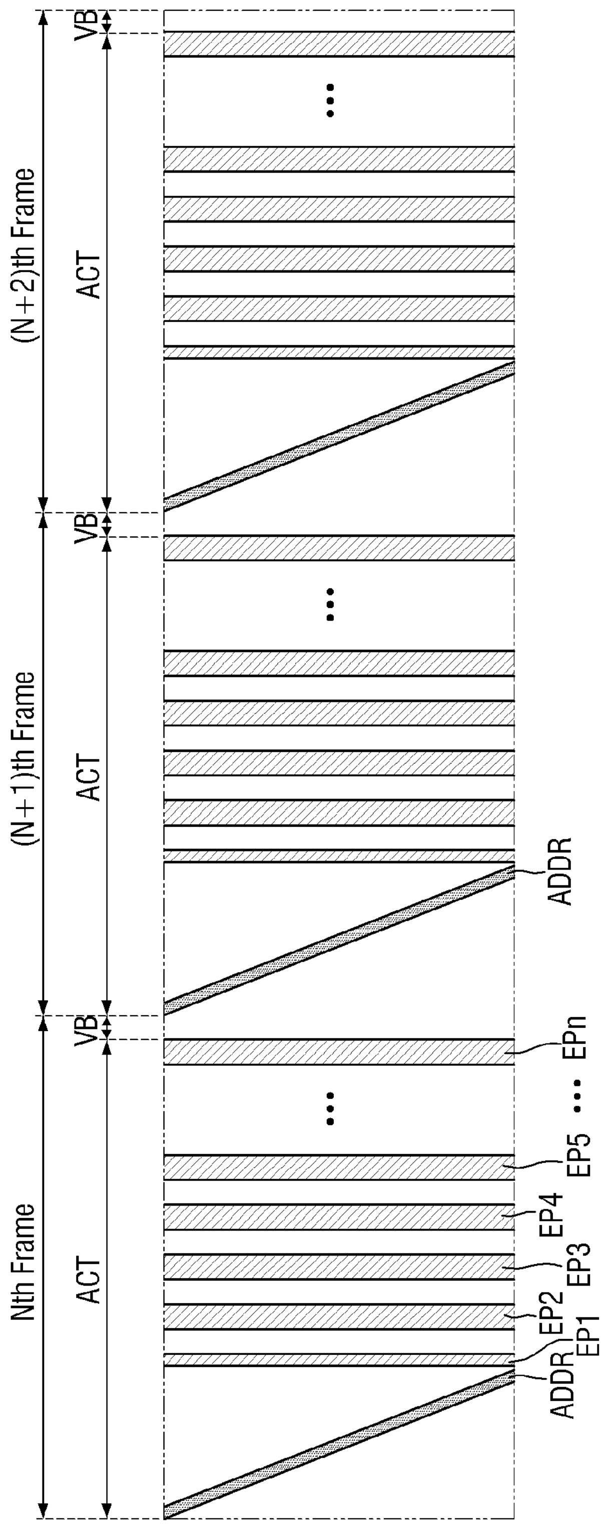
FIG. 6 shows an example of the operation of the display device during the $N^{th}$ to $(N+2)^{th}$ frame periods.

FIG. 6 shows another example of the operation of the display device during the $N^{th}$ to $(N+2)^{th}$ frame periods.

The embodiment of FIG. 6 is different from the embodiment of FIG. 5 in that the sub-pixels RP, GP, and BP of the display panel 100 simultaneously emit light in each of the plurality of emission periods EP1, EP2, EP3, EP4, EP5, . . . , EPn. In FIG. 6, the x-axis may represent time divided into frame periods and the y-axis may represent the pixel rows of the display panel 100. For example, the highest point on the y-axis may correspond to the first pixel row and the lowest point on the y-axis may corresponds to the last pixel row.

Referring to FIG. 6, the address period ADDR does not overlap the plurality of emission periods EP1, EP2, EP3, EP4, . . . , EPn. The first emission period EP1 may occur after the address period ADDR has completely ended.

The plurality of emission periods EP1, EP2, EP3, EP4, . . . , EPn do not overlap each other. In each of the plurality of emission periods EP1, EP2, EP3, EP4, EP5, . . . , EPn, the sub-pixels RP, GP, and BP disposed in all row lines may simultaneously emit light.

Figure 7:
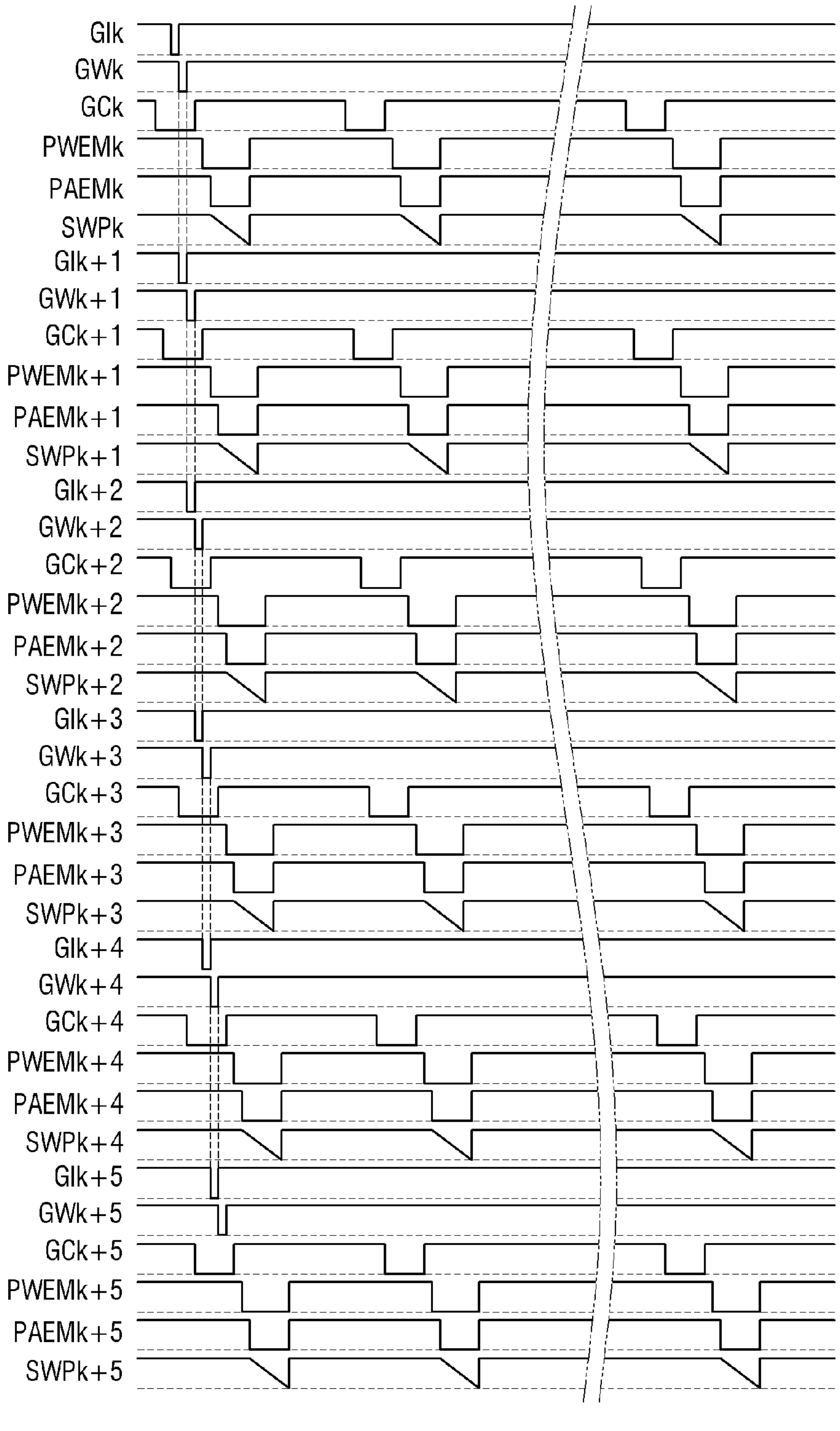
FIG. 7 is a waveform diagram showing scan initialization signals, scan write signals, scan control signals, PWM emission signals, PAM emission signals, and sweep signals applied to sub-pixels disposed on $k^{th}$ to $(k+5)^{th}$ row lines in the $N^{th}$ frame period according to an embodiment.

FIG. 7 is a waveform diagram showing scan initialization signals, scan write signals, scan control signals, PWM emission signals, PAM emission signals, and sweep signals applied to sub-pixels disposed on $k^{th}$ to $(k+5)^{th}$ row lines in the $N^{th}$ frame period according to an embodiment.

Referring to FIG. 7, the sub-pixels RP, GP, and BP disposed on the $k^{th}$ row line indicate the sub-pixels RP, GP, and BP connected to the $k^{th}$ scan initialization line GILk, the $k^{th}$ scan write line GWLk, the $k^{th}$ scan control line GCLk, the $k^{th}$ PWM emission line PWELk, the $k^{th}$ PAM emission line PAELk, and the $k^{th}$ sweep signal line SWPLk. The $k^{th}$ scan initialization signal GIk indicates the signal applied to the $k^{th}$ scan initialization line GILk, and the $k^{th}$ scan write signal GWk indicates the signal applied to the $k^{th}$ scan write line GWLk. A $k^{th}$ scan control signal GCk indicates the signal applied to the $k^{th}$ scan control line GCLk, and the $k^{th}$ PWM emission signal PWEMk indicates the signal applied to the $k^{th}$ PWM emission line PWELk. The $k^{th}$ PAM emission signal PAEMk indicates the signal applied to the $k^{th}$ PAM emission line PAELk, and the $k^{th}$ sweep signal SWPk indicates the signal applied to the $k^{th}$ sweep signal line SWPLk.

Scan initialization signals GIk to GIk+5, scan write signals GWk to GWk+5, scan control signals GCk to GCk+5, PWM emission signals PWEMk to PAEMk+5, PAM emission signals PAEMk to PAEMk+5, and sweep signals SWPk to SWPk+5 may be sequentially shifted by one horizontal period (1H). The $k^{th}$ scan write signal GWk may be the signal obtained by shifting the $k^{th}$ scan initialization signal GIk by one horizontal period, and a $(k+1)^{th}$ scan write signal GWk+1 may be the signal obtained by shifting a $(k+1)^{th}$ scan initialization signal GIk+1 by one horizontal period. In this case, since the $(k+1)^{th}$ scan initialization signal GIk+1 is the signal obtained by shifting the $k^{th}$ scan initialization signal GIk by one horizontal period, the $k^{th}$ scan write signal GWk and the $(k+1)^{th}$ scan initialization signal GIk+1 may be substantially the same.

Figure 8:
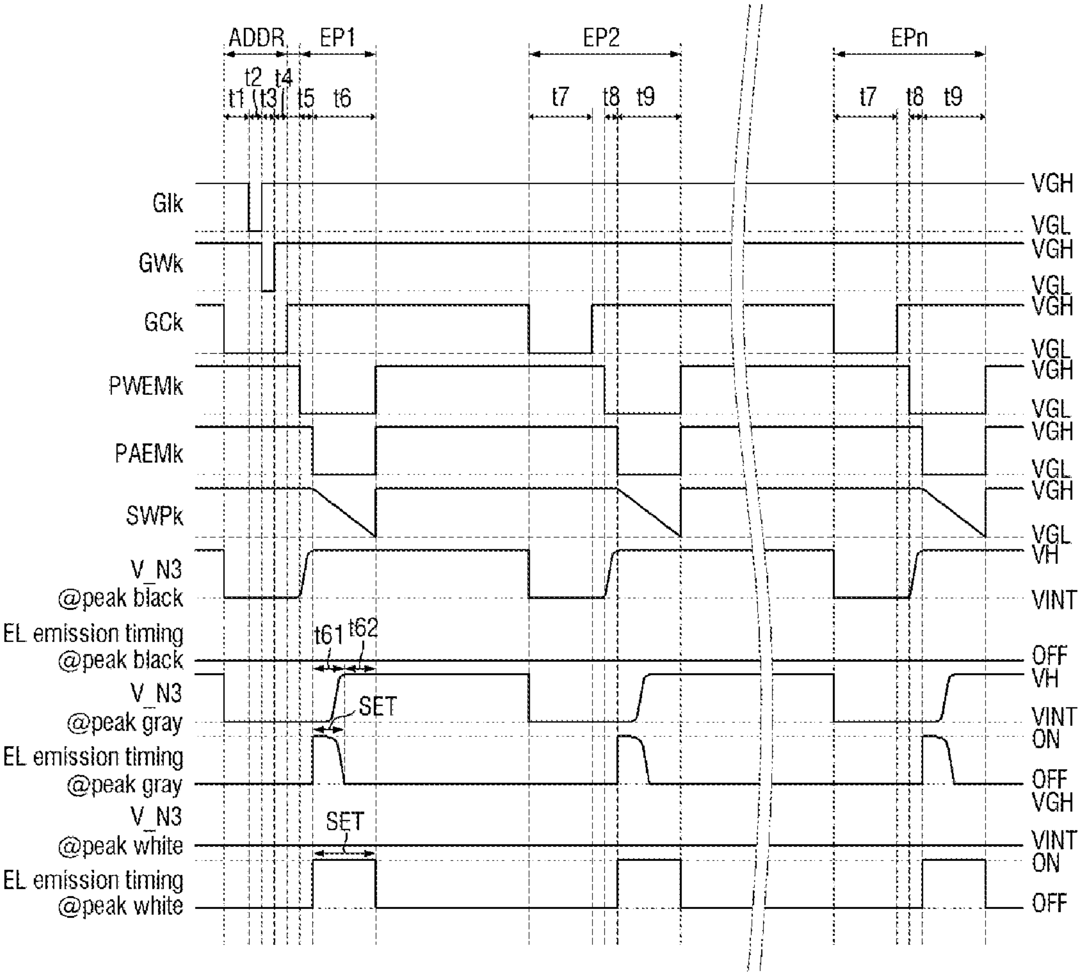
FIG. 8 is a waveform diagram showing the $k^{th}$ scan initialization signal, the $k^{th}$ scan write signal, the $k^{th}$ scan control signal, the $k^{th}$ PWM emission signal, the $k^{th}$ PAM emission signal, and the $k^{th}$ sweep signal applied to each of sub-pixels disposed in the $k^{th}$ row line, the voltage of the third node, and the period in which a driving current is applied to a light emitting element in the $N^{th}$ frame period according to an embodiment.

FIG. 8 is a waveform diagram showing the $k^{th}$ scan initialization signal, the $k^{th}$ scan write signal, the $k^{th}$ scan control signal, the $k^{th}$ PWM emission signal, the $k^{th}$ PAM emission signal, and the $k^{th}$ sweep signal applied to each of sub-pixels disposed in the $k^{th}$ row line, the voltage of the third node, and the period in which a driving current is applied to a light emitting element in the $N^{th}$ frame period according to an embodiment.

Referring to FIG. 8, the $k^{th}$ scan initialization signal GIk is the signal for controlling turn-on and turn-off of the third transistor T3 and the tenth transistor T10 of each of the sub-pixels RP, GP, and BP. The $k^{th}$ scan write signal GWk is the signal for controlling turn-on and turn-off of the second, fourth, ninth, and eleventh transistors T2, T4, T9, and T11 of each of the sub-pixels RP, GP, and BP. The $k^{th}$ scan control signal GCk is the signal for controlling turn-on and turn-off of the seventh, thirteenth, sixteenth, and eighteenth transistors T7, T13, T16, and T18 of each of the sub-pixels RP, GP, and BP. The $k^{th}$ PWM emission signal PWEMk is the signal for controlling turn-on and turn-off of the fifth, sixth, twelfth, and fourteenth transistors T5, T6, T12, and T14. The $k^{th}$ PAM emission signal PAEMk is the signal for controlling turn-on and turn-off of the seventeenth transistor T17. The $k^{th}$ scan initialization signal, the $k^{th}$ scan write signal, the $k^{th}$ scan control signal, the $k^{th}$ PWM emission signal, the $k^{th}$ PAM emission signal, and the $k^{th}$ sweep signal may be generated at a cycle of one frame period.

The data address period ADDR includes first to fourth periods t1 to t4. The first period t1 and the fourth period t4 are a first initialization period for initializing the first electrode of the light emitting element EL and the voltage of the third node N3 (e.g., V_N3). The second period t2 is a second initialization period for initializing the gate electrode of the first transistor T1 and the gate electrode of the eighth transistor T8. The third period t3 is the period for sampling a PWM data voltage Vdata of the $j^{th}$ PWM data line DLj and the threshold voltage Vth1 of the first transistor T1 at the gate electrode of the first transistor T1 and sampling a first PAM data voltage Rdata of the first PAM data line RDL and a threshold voltage Vth8 of the eighth transistor T8 at the gate electrode of the eighth transistor T8.

The first emission period EP1 includes a fifth period t5 and a sixth period t6. The first emission period EP1 is the period for controlling the turn-on period of the fifteenth transistor T15 depending on the control current Ic and supplying the driving current Ids to the light emitting element EL.

Each of the second to $n^{th}$ emission periods EP2 to EPn includes seventh to ninth periods t7 to t9. The seventh period t7 is a third initialization period for initializing the third node N3, the eighth period t8 is substantially the same as the fifth period t5, and the ninth period t9 is substantially the same as the sixth period t6.

Among the first to $n^{th}$ emission periods EP1 to EPn, emission periods adjacent to each other may be spaced apart from each other by about several to several tens of horizontal periods.

The $k^{th}$ scan initialization signal GIk may have the gate-on voltage VGL during the second period t2, and may have the gate-off voltage VGH during the remaining periods. That is, the $k^{th}$ scan initialization signal GIk may have a scan initialization pulse generated by the gate-on voltage VGL during the second period t2. The gate-off voltage VGH may be the voltage having a level higher than that of the gate-on voltage VGL.

The $k^{th}$ scan write signal GWk may have the gate-on voltage VGL during the third period t3, and may have the gate-off voltage VGH during the remaining periods. That is, the $k^{th}$ scan write signal GWk may have a scan write pulse generated by the gate-on voltage VGL during the third period t3.

The $k^{th}$ scan control signal GCk may have the gate-on voltage VGL during the first to fourth periods t1 to t4 and the seventh period t7, and may have the gate-off voltage VGH during the remaining periods. That is, the $k^{th}$ scan control signal GCk may have a scan control pulse generated by the gate-on voltage VGL during the first to fourth periods t1 to t4 and the seventh period t7.

The $k^{th}$ sweep signal SWPk may have a triangular wave sweep pulse during the sixth period t6 and the ninth period t9, and may have the gate-off voltage VGH during the remaining periods. For example, the sweep pulse of the $k^{th}$ sweep signal SWPk may have a triangular wave pulse that linearly decreases from the gate-off voltage VGH to the gate-on voltage Von in each of the sixth period t6 and the ninth period t9, and immediately increases from the gate-on voltage Von to the gate-off voltage Voff at the end of the sixth period t6 and at the end of the ninth period t9.

The $k^{th}$ PWM emission signal PWEMk may have the gate-on voltage VGL during the fifth and sixth periods t5 and t6 and the eighth and ninth periods t8 and t9, and may have the gate-off voltage VGH during the remaining periods. That is, the $k^{th}$ PWM emission signal PWEMk may include PWM pulses generated by the gate-on voltage VGL during the fifth and sixth periods t5 and t6 and the eighth and ninth periods t8 and t9.

The $k^{th}$ PAM emission signal PAEMk may have the gate-on voltage VGL during the sixth period t6 and the ninth period t9, and may have the gate-off voltage VGH during the remaining periods. That is, the $k^{th}$ PAM emission signal PAEMk may include PAM pulses generated by the gate-on voltage VGL during the sixth period t6 and the ninth period t9. In an embodiment, the PWM pulse width of the $k^{th}$ PWM emission signal PWEMk is greater than the sweep pulse width of the $k^{th}$ sweep signal SWPk. For example, the pulse width of the $k^{th}$ PAM emission signal PAEMk during the sixth period t6 may be greater than the pulse width of the triangular wave sweep pulse.

Figure 9:
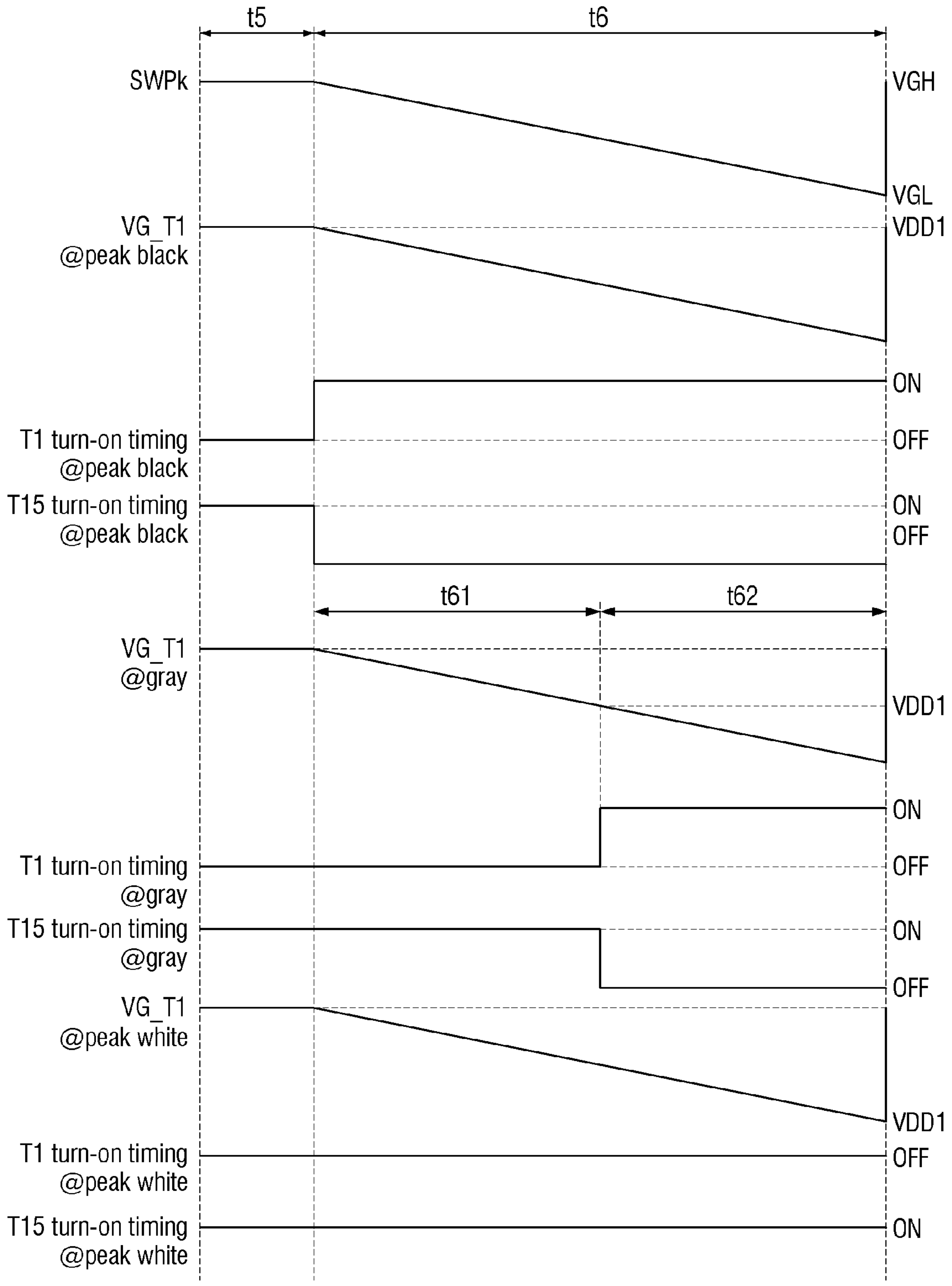
FIG. 9 is a timing diagram illustrating the $k^{th}$ sweep signal, the voltage of the gate electrode of the first transistor, the turn-on timing of the first transistor, and the turn-on timing of the fifteenth transistor during the fifth period and the sixth period according to an embodiment.

FIG. 9 is a timing diagram illustrating the $k^{th}$ sweep signal, the voltage of the gate electrode of the first transistor, the turn-on timing of the first transistor, and the turn-on timing of the fifteenth transistor during the fifth period and the sixth period according to an embodiment. FIGS. 10 to 13 are circuit diagrams illustrating the operation of the first sub-pixel during the first period, the second period, the third period, and the sixth period of FIG. 8.

Hereinafter, the operation of the first sub-pixel RP according to an embodiment during the first to ninth periods t1 to t9 will be described in detail in conjunction with FIGS. 9 to 13.

Figure 10:
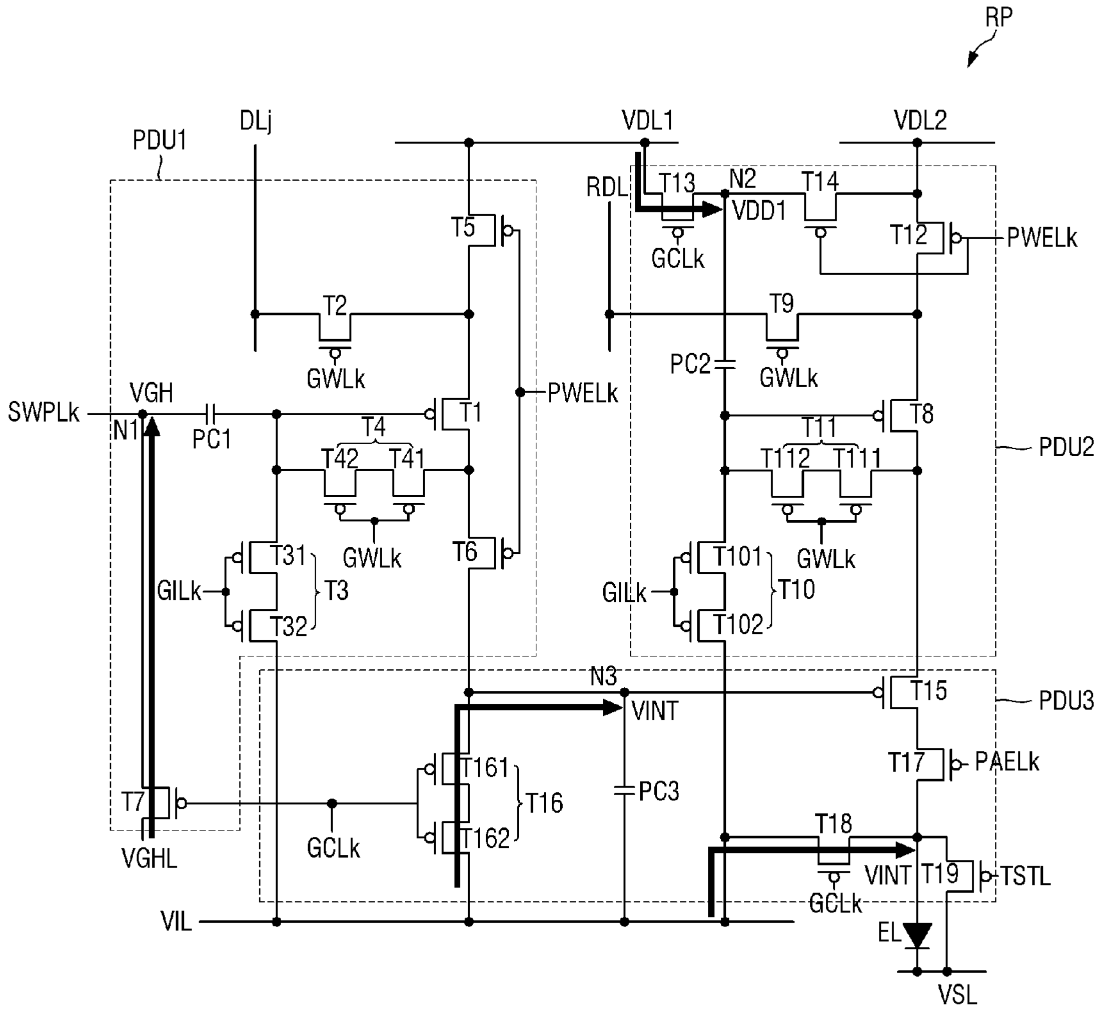
FIGS. 10 to 13 are circuit diagrams illustrating the operation of the first sub-pixel during the first period, the second period, the third period, and the sixth period of FIG. 8.

First, during the first period t1, as shown in FIG. 10, the seventh transistor T7, the thirteenth transistor T13, the sixteenth transistor T16, and the eighteenth transistor T18 are turned on by the $k^{th}$ scan control signal GCk of the gate-on voltage VGL.

Due to the turn-on of the seventh transistor T7, the gate-off voltage VGH of the gate-off voltage line VGHL is applied to the first node N1. Due to the turn-on of the thirteenth transistor T13, the first power voltage VDD1 of the first power line VDL1 is applied to the second node N2.

Due to the turn-on of the sixteenth transistor T16, the third node N3 is initialized to the initialization voltage VINT of the initialization voltage line VIL, and the fifteenth transistor T15 is turned on by the initialization voltage VINT of the third node N3. Due to the turn-on of the eighteenth transistor T18, the first electrode of the light emitting element EL is initialized to the initialization voltage VINT of the initialization voltage line VIL.

Figure 11:
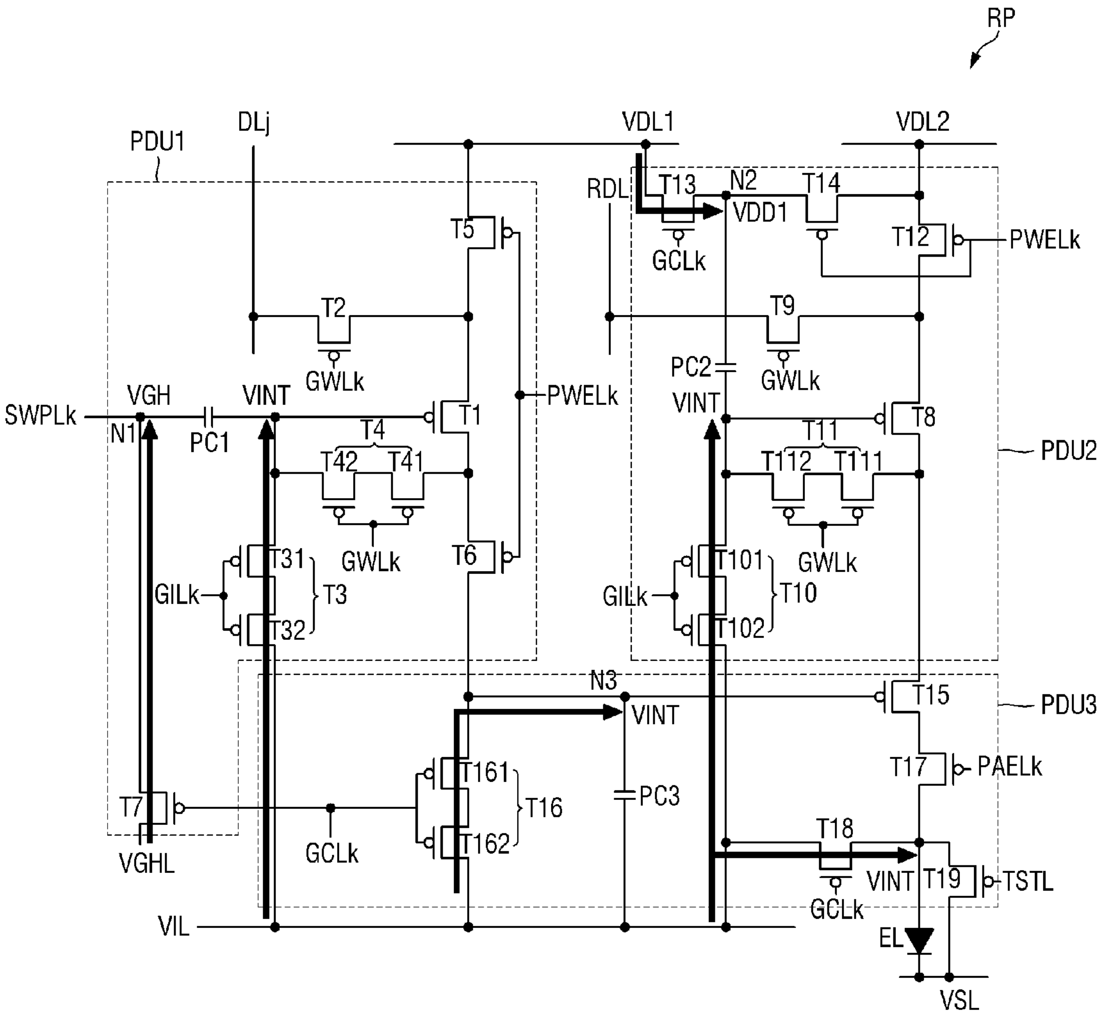

Second, during the second period t2, as shown in FIG. 11, the seventh transistor T7, the thirteenth transistor T13, the sixteenth transistor T16, and the eighteenth transistor T18 are turned on by the $k^{th}$ scan control signal GCk of the gate-on voltage VGL. Further, during the second period t2, the third transistor T3 and the tenth transistor T10 are turned on by the $k^{th}$ scan initialization signal GIk of the gate-on voltage VGL.

The seventh transistor T7, the thirteenth transistor T13, the fifteenth transistor T15, the sixteenth transistor T16, and the eighteenth transistor T18 are substantially the same as those described in the first period t1.

Due to the turn-on of the third transistor T3, the gate electrode of the first transistor T1 is initialized to the initialization voltage VINT of the initialization voltage line VIL. Further, due to the turn-on of the tenth transistor T10, the gate electrode of the eighth transistor T8 is initialized to the initialization voltage VINT of the initialization voltage line VIL.

In this case, since the gate-off voltage VGH of the gate-off voltage line VGHL is applied to the first node N1, it is possible to prevent variation in the gate-off voltage VGH of the $k^{th}$ sweep signal SWPk due to the reflection of voltage variation of the gate electrode of the first transistor T1 in the $k^{th}$ sweep signal line SWPLk by a first pixel capacitor PC1.

Figure 12:
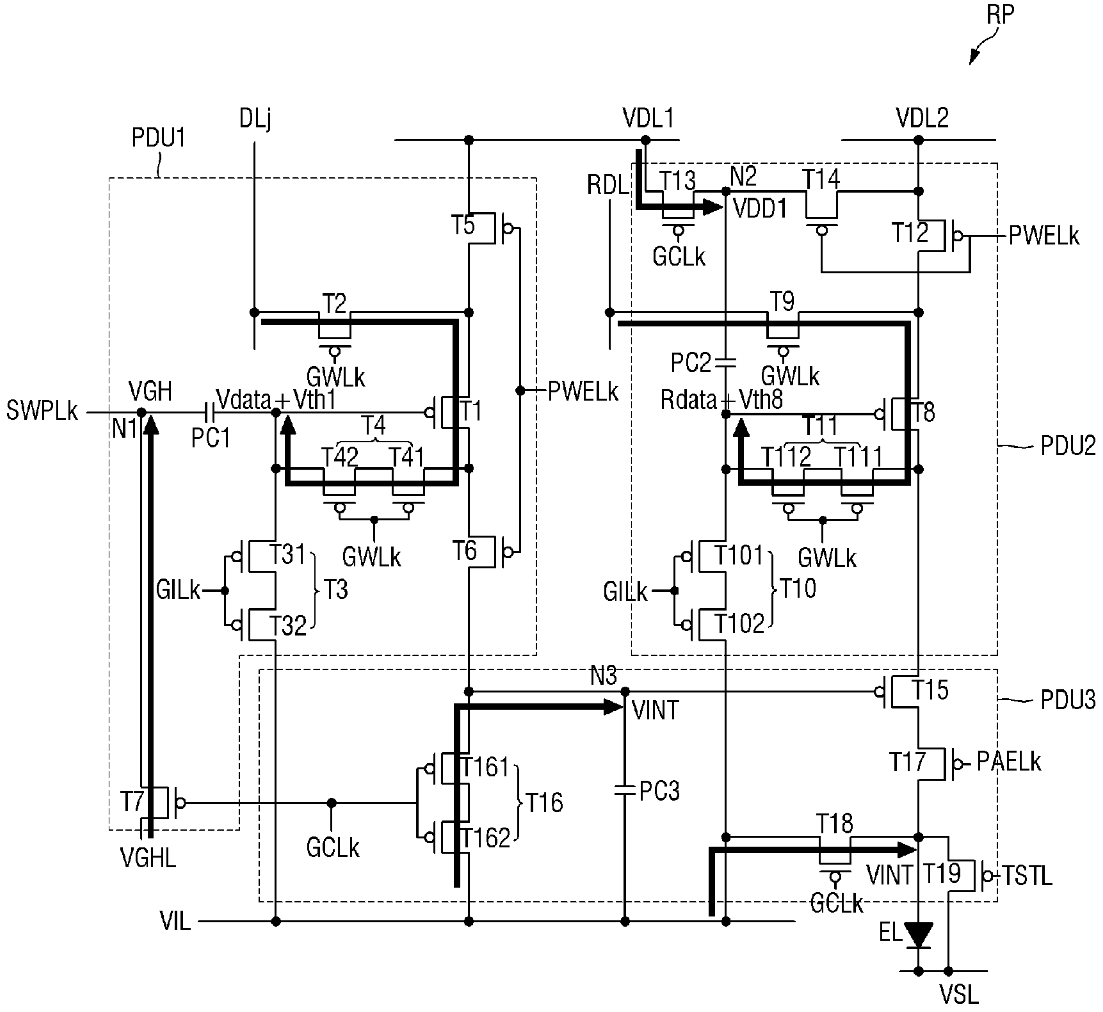

Third, during the third period t3, as shown in FIG. 12, the seventh transistor T7, the thirteenth transistor T13, the sixteenth transistor T16, and the eighteenth transistor T18 are turned on by the $k^{th}$ scan control signal GCk of the gate-on voltage VGL. Further, during the third period t3, the second transistor T2, the fourth transistor T4, the ninth transistor T9, and the eleventh transistor T11 are turned on by the $k^{th}$ scan write signal GWk of the gate-on voltage VGL.

The seventh transistor T7, the thirteenth transistor T13, the fifteenth transistor T15, the sixteenth transistor T16, and the eighteenth transistor T18 are substantially the same as those described in the first period t1.

Due to the turn-on of the second transistor T2, the PWM data voltage Vdata of the $j^{th}$ PWM data line DLj is applied to the first electrode of the first transistor T1. Due to the turn-on of the fourth transistor T4, the gate electrode and the second electrode of the first transistor T1 are connected to each other, so that the first transistor T1 operates as a diode.

In this case, since the voltage (Vgs=Vint−Vdata) between the gate electrode and the first electrode of the first transistor T1 is greater than the threshold voltage Vth1, the first transistor T1 is turned on to form a current path until the voltage Vgs between the gate electrode and the first electrode reaches the threshold voltage Vth1. Accordingly, the voltage of the gate electrode of the first transistor T1 may increase from "Vint" to "Vdata+Vth1." When the first transistor T1 is a P-type MOSFET, the threshold voltage Vth1 of the first transistor T1 may be less than 0V.

Further, since the gate-off voltage VGH of the gate-off voltage line VGHL is applied to the first node N1, it is possible to prevent variation in the gate-off voltage VGH of the $k^{th}$ sweep signal SWPk due to the reflection of the voltage variation of the gate electrode of the first transistor T1 in the $k^{th}$ sweep signal line SWPLk by the first pixel capacitor PC1.

Due to the turn-on of the ninth transistor T9, a first PAM data voltage Rdata of the first PAM data line RDL is applied to the first electrode of the eighth transistor T8. Due to the turn-on of the ninth transistor T9, the gate electrode and the second electrode of the eighth transistor T8 are connected to each other, so that the eighth transistor T8 operates as a diode.

At this time, since the voltage (Vgs=Vint−Rdata) between the gate electrode and the first electrode of the eighth transistor T8 is greater than the threshold voltage Vth8, the eighth transistor T8 forms a current path until the voltage Vgs between the gate electrode and the first electrode reaches the threshold voltage Vth8. Accordingly, the voltage of the gate electrode of the eighth transistor T8 may increase from "Vint" to "Rdata+Vth."

Fourth, during the fourth period t4, the seventh transistor T7, the thirteenth transistor T13, the sixteenth transistor T16, and the eighteenth transistor T18 are turned on by the $k^{th}$ scan control signal GCk of the gate-on voltage VGL.

The seventh transistor T7, the thirteenth transistor T13, the sixteenth transistor T16, and the eighteenth transistor T18 are substantially the same as those described in the first period t1.

Figure 13:
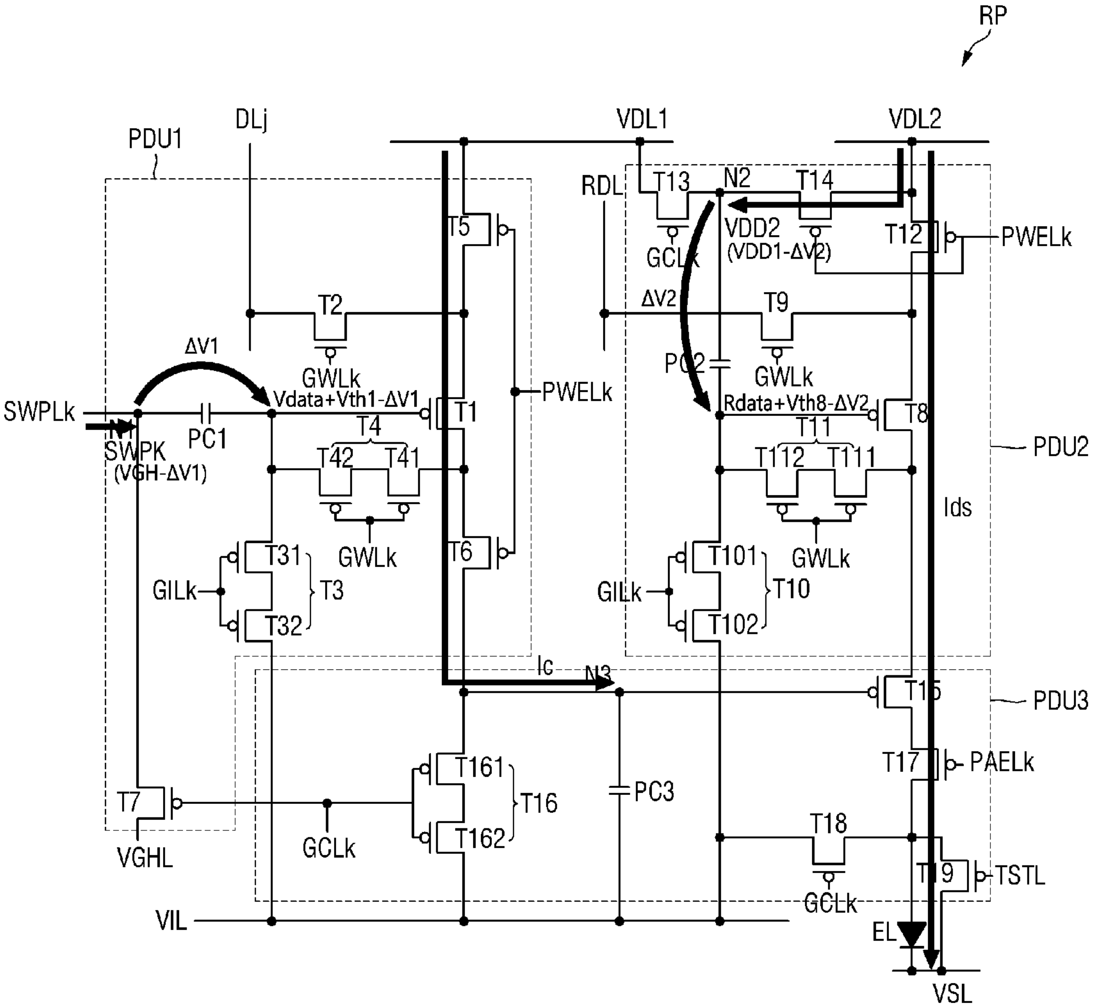

Fifth, during the fifth period t5, as shown in FIG. 13, the fifth transistor T5, the sixth transistor T6, the twelfth transistor T12, and the fourteenth transistor T14 are turned on by the $k^{th}$ PWM emission signal PWEMk of the gate-on voltage VGL.

Due to the turn-on of the fifth transistor T5, the first power voltage VDD1 is applied to the first electrode of the first transistor T1. Further, due to the turn-on of the sixth transistor T6, the second electrode of the first transistor T1 is connected to the third node N3.

During the fifth period t5, the control current Ic flowing in response to the voltage (Vdata+Vth1) of the gate electrode of the first transistor T1 does not depend on the threshold voltage Vth1 of the first transistor T1 as shown in Eq. 1.

$$Ids=k''\times(Vgs-Vth1)^2=k''\times(Vdata+Vth1-VDD1-Vth1)^2=k''\times(Vdata-VDD1)^2 \qquad \text{[Eq. 1]}$$

In Eq. 1, k" indicates a proportional coefficient determined by the structure and physical characteristics of the first transistor T1, Vth1 indicates the threshold voltage of the first transistor T1, VDD1 indicates the first power voltage, and Vdata indicates the PWM data voltage.

Further, due to the turn-on of the twelfth transistor T12, the first electrode of the eighth transistor T8 may be connected to the second power line VDL2.

Further, due to the turn-on of the fourteenth transistor T14, the second power voltage VDD2 of the second power line VDL2 is applied to the second node N2. When the second power voltage VDD2 of the second power supply line VDL2 varies due to a voltage drop or the like, a voltage difference ΔV2 between the first power voltage VDD1 and the second power voltage VDD2 may be reflected in the gate electrode of the eighth transistor T8 by a second pixel capacitor PC2.

Due to the turn-on of the fourteenth transistor T14, the driving current Ids flowing in response to the voltage (Rdata+Vth8) of the gate electrode of the eighth transistor T8 may be supplied to the fifteenth transistor T15. The driving current Ids does not depend on the threshold voltage Vth8 of the eighth transistor T8 as shown in Eq. 2.

$$Ids=k'\times(Vgs-Vth8)^2=k'\times(Rdata+Vth8-\Delta V2-VDD2-Vth8)^2=k'\times(Rdata-\Delta V2-VDD2)^2 \qquad \text{[Eq. 2]}$$

In Eq. 2, k' indicates the proportional coefficient determined by the structure and physical characteristics of the eighth transistor T8, Vth8 indicates the threshold voltage of the eighth transistor T8, VDD2 indicates the second power voltage, and Rdata indicates the first PAM data voltage.

Sixth, during the sixth period t6, as shown in FIG. 13, the fifth transistor T5, the sixth transistor T6, the twelfth transistor T12, and the fourteenth transistor T14 are turned on by the $k^{th}$ PWM emission signal PWEMk of the gate-on voltage VGL. During the sixth period t6, as shown in FIG. 13, the seventeenth transistor T17 is turned on by the $k^{th}$ PAM emission signal PAEMk of the gate-on voltage VGL. During the sixth period t6, the $k^{th}$ sweep signal SWPk linearly decreases from the gate-off voltage VGH to the gate-on voltage Von.

The fifth transistor T5, the sixth transistor T6, the twelfth transistor T12, and the fourteenth transistor T14 are substantially the same as those described in the fifth period t5.

Due to the turn-on of the seventeenth transistor T17, the first electrode of the light emitting element EL may be connected to the second electrode of the fifteenth transistor T15.

During the sixth period t6, the $k^{th}$ sweep signal SWPk linearly decreases from the gate-off voltage VGH to the gate-on voltage Von, and voltage variation ΔV1 of the $k^{th}$ sweep signal SWPk is reflected in the gate electrode of the first transistor T1 by the first pixel capacitor PC1, so that the voltage of the gate electrode of the first transistor T1 may be Vdata+Vth1−ΔV1. That is, as the voltage of the $k^{th}$ sweep signal SWPk decreases during the sixth period t6, the voltage of the gate electrode of the first transistor T1 may linearly decrease.

The period in which the control current Ic is applied to the third node N3 may vary depending on the magnitude of the PWM data voltage Vdata applied to the first transistor T1.

Since the voltage of the third node N3 (e.g., V_N3) varies depending on the magnitude of the PWM data voltage Vdata applied to the first transistor T1, the turn-on period of the fifteenth transistor T15 may be controlled. Therefore, it is possible to control a period SET in which the driving current Ids is applied to the light emitting element EL during the sixth period t6 by controlling the turn-on period of the fifteenth transistor T15.

First, as shown in FIG. 9, when the PWM data voltage Vdata of the gate electrode of the first transistor T1 is the PWM data voltage of a peak black gray level, a voltage VG_T1 of the gate electrode of the first transistor T1 may be lower than the first power voltage VDD1 that is the voltage of the first electrode of the first transistor T1 throughout the sixth period t6 due to the decrease in the voltage of the $k^{th}$ sweep signal SWPk. Therefore, the first transistor T1 may be turned on throughout the sixth period t6. Accordingly, the control current Ic of the first transistor T1 may flow to the third node N3 throughout the fifth period t5 and the sixth period t6, and the voltage of the third node N3 may increase to a high level VH during the fifth period t5. Therefore, the fifteenth transistor T15 may be turned off throughout the sixth period t6. Accordingly, since the driving current Ids is not applied to the light emitting element EL during the sixth period t6, the light emitting element EL does not emit light during the sixth period t6.

Further, as shown in FIG. 9, when the PWM data voltage Vdata of the gate electrode of the first transistor T1 is the PWM data voltage of a gray level, the voltage VG_T1 of the gate electrode of the first transistor T1 may have a level higher than that of the first power voltage VDD1 during a first sub-period t61 due to the decrease in the voltage of the $k^{th}$ sweep signal SWPk, and may have a level lower than that of the first power voltage VDD1 during a second sub-period t62. Therefore, the first transistor T1 may be turned on during the second sub-period t62 of the sixth period t6. In this case, since the control current Ic of the first transistor T1 flows to the third node N3 during the second sub-period t62, the voltage of the third node N3 (e.g., V_N3) may have the high level VH during the second sub-period t62. Therefore, the fifteenth transistor T15 may be turned off during the second sub-period t62. Hence, the driving current Ids is applied to the light emitting element EL during the first sub-period t61 and is not applied to the light emitting element EL during the second sub-period t62. That is, the light emitting element EL may emit light during the first sub-period t61 that is a part of the sixth period t6. As the first sub-pixel RP emits a light corresponding to a gray level close to the peak black gray level, the emission period SET of the light emitting element EL may be shortened. Further, as the first sub-pixel RP emits a light corresponding to a gray level close to a peak white gray level, the emission period SET of the light emitting element EL may be increased.

Further, as shown in FIG. 9, when the PWM data voltage Vdata of the gate electrode of the first transistor T1 is the PWM data voltage of the peak white gray level, the voltage VG_T1 of the gate electrode of the first transistor T1 may be higher than the first power voltage VDD1 during the sixth period t6 despite the decrease in the voltage of the $k^{th}$ sweep signal SWPk. Accordingly, the first transistor T1 may be turned off throughout the sixth period t6. In this case, since the control current Ic of the first transistor T1 does not flow to the third node N3 throughout the sixth period t6, the voltage of the third node N3 (e.g., V_N3) may be maintained at the initialization voltage VINT. Therefore, the fifteenth transistor T15 may be turned on throughout the sixth period t6. Therefore, the driving current Ids may be applied to the light emitting element EL throughout the sixth period t6, and the light emitting element EL may emit light throughout the sixth period t6.

Further, as the $k^{th}$ sweep signal SWPk rises from the gate-on voltage VGL to the gate-off voltage VGH at the end of the sixth period t6, the voltage VG_T1 of the gate electrode of the first transistor T1 may increase to a level that is substantially the same as that in the fifth period t5 at the end of the sixth period t6.

As described above, the emission period of the light emitting element EL may be adjusted by adjusting the PWM data voltage applied to the gate electrode of the first transistor T1. Therefore, the gray level to be emitted by the first sub-pixel RP may be adjusted by adjusting the period in which the driving current Ids is applied to the light emitting element EL while maintaining the driving current Ids applied to the light emitting element EL at a constant level rather than by adjusting the magnitude of the driving current Ids applied to the light emitting element EL.

Meanwhile, when the digital video data converted to the PWM data voltages is 8 bits, the digital video data of the peak black gray level may be 0, and the digital video data of the peak white gray level may be 255. Further, the digital video data of a black gray level region may be 0 to 63 (e.g., between first and second levels), the digital video data of a gray level region may be 64 to 191 (e.g., between second and third levels), and the digital video data of a white gray level region may be 192 to 255 (e.g., between third level and a maximum level supported by the display device).

Further, the seventh period t7, the eighth period t8, and the ninth period t9 of each of the second to $n^{th}$ emission periods EP2 to EPn are substantially the same as the first period t1, the fifth period t5, and the sixth period t6 that are described above, respectively. That is, in each of the second to $n^{th}$ emission periods EP2 to EPn, after the third node N3 is initialized, the period in which the driving current Ids generated in response to the first PAM data voltage Rdata written in the gate electrode of the eighth transistor T8 is applied to the light emitting element EL may be adjusted based on the PWM data voltage Vdata written in the gate electrode of the first transistor T1 during the address period ADDR.

Further, since the test signal of the test signal line TSTL is applied at the gate-off voltage VGH during the active period ACT of the $N^{th}$ frame period, the nineteenth transistor T19 may be turned off during the active period ACT of the $N^{th}$ frame period.

Meanwhile, since the second sub-pixel GP and the third sub-pixel BP may operate substantially in the same manner as the first sub-pixel RP as described in conjunction with FIGS. 8 to 12, the description of the operations of the second sub-pixel GP and the third sub-pixel BP will be omitted.

Figure 14:
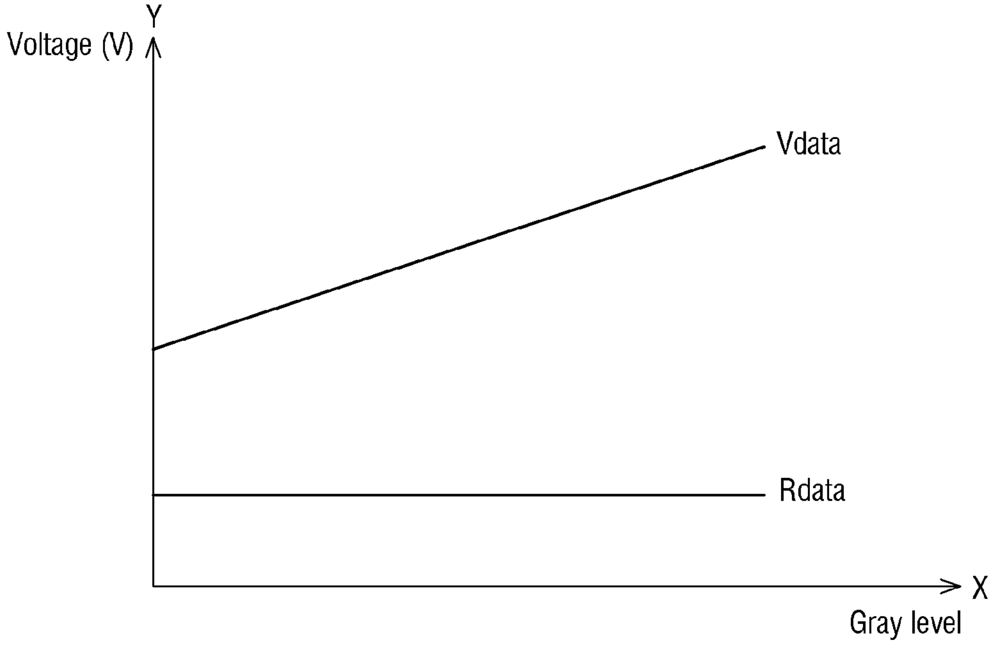
FIG. 14 is a graph illustrating an example of the PWM data voltage of the $j^{th}$ PWM data line and the first PAM data voltage according to a gray level.

FIG. 14 is a graph illustrating an example of the PWM data voltage of the $j^{th}$ PWM data line and the first PAM data voltage according to a gray level. In FIG. 14, the X-axis represents a gray level to be emitted by the first sub-pixel RP, and the Y-axis represents a voltage.

Referring to FIG. 14, the digital video data Vdata may increase as the gray level increases. That is, the digital video data Vdata may be proportional to the gray level. Further, the PWM data voltage Vdata of the $j^{th}$ PWM data line DLj may increase as the gray level increases. That is, the PWM data voltage Vdata may be proportional to the gray level. Further, the first PAM data voltage Rdata may be constant regardless of the gray level. Therefore, the driving current Ids applied to the light emitting element LE may be constant regardless of the gray level.

The emission period of the light emitting element EL may be adjusted by adjusting the PWM data voltage Vdata applied to the gate electrode of the first transistor T1 of the first sub-pixel RP. Therefore, the gray level to be emitted by the first sub-pixel RP may be adjusted by adjusting the period in which the driving current Ids is applied to the light emitting element EL while maintaining the driving current Ids applied to the light emitting element EL at a constant level.

Since the PWM data voltage and the second PAM data voltage applied to the second sub-pixel GP, and the PWM data voltage and the second PAM data voltage applied to the third sub-pixel BP are substantially the same as the PWM data voltage and the second PAM data voltage applied to the first sub-pixel RP described in conjunction with FIG. 14, the description thereof will be omitted.

Figure 15:
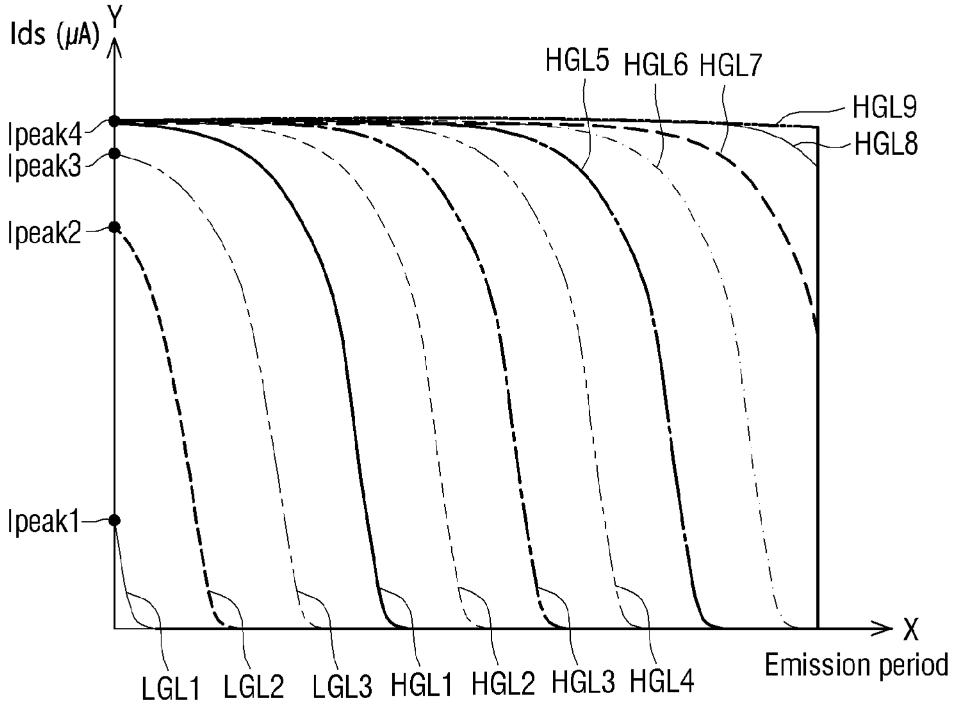
FIG. 15 is a waveform diagram illustrating the emission period of a driving current in response to a gray level to be emitted according to an embodiment.

FIG. 15 is a waveform diagram illustrating the emission period of a driving current in response to a gray level to be emitted according to an embodiment.

In FIG. 15, the X axis represents the period in which the driving current Ids is applied to the light emitting element EL, i.e., the emission period of the light emitting element EL, and the Y axis represents the magnitude of the driving current Ids. FIG. 15 shows the period in which the driving current Ids is applied to the light emitting element LE, i.e., the emission period of the light emitting element LE, at each of first to third low gray levels LGL1 to LGL3 and first to ninth high gray levels HGL1 to HGL9.

Referring to FIG. 15, the period in which the driving current Ids is applied to the light emitting element EL may be adjusted depending on the gray level. For example, the period in which the driving current Ids is applied to the light emitting element EL may increase as the gray level increases from the first low gray level LGL1 toward the ninth high gray level HGL9.

In this case, as described in FIG. 13, the period in which the control current Ic of the first transistor T1 is applied to the third node N3 is adjusted by reflecting the voltage variation of the $k^{th}$ sweep signal SWPk in the gate electrode of the first transistor T1, so that the turn-on timing of the fifteenth transistor T15 is controlled. In this case, due to the characteristics of the fifteenth transistor T15, the driving current Ids may have a curved waveform instead of a right-angled square wave. Since the driving current Ids has a curved waveform, when the period in which the driving current Ids is applied to the light emitting element EL is short as in the low gray level region, the peak current value of the driving current Ids may not reach a desired current value. For example, a first peak current value Ipeak1 of the driving current Ids at the first low gray level LGL1, a second peak current value Ipeak2 of the driving current Ids at the second low gray level LGL2, and a third peak current value Ipeak3 of the driving current Ids at the third low gray level LGL3 may be different from each other. Further, the first peak current value Ipeak1, the second peak current value Ipeak2, and the third peak current value Ipeak3 may be lower than a fourth peak current value Ipeak4 of the driving current Ids at the first high gray level HGL1. On the contrary, the peak current value Ipeak4 of the driving currents Ids may be substantially the same or substantially similar to the first to ninth high gray levels HGL1 to HGL9.

When the peak current value of the driving current Ids varies in the low gray level region, the color coordinates of the image displayed by the display panel 100 may be changed in the low gray level region. Further, in the low gray level region, the light emitting efficiency of the light emitting element of the first sub-pixel RP, the light emitting efficiency of the light emitting element of the second sub-pixel GP, and the light emitting efficiency of the light emitting element of the third sub-pixel BP may vary depending on the driving current Ids. Therefore, it is beneficial to maintain the color coordinates of the image displayed by the display panel 100 at constant values in the low gray level region, and to maintain the peak current value of the driving current Ids of the low gray level region in each of the first sub-pixel RP, the second sub-pixel GP, and the third sub-pixel BP so that the light emitting element EL of the first sub-pixel RP, the light emitting element EL of the second sub-pixel GP, and the light emitting element EL of the third sub-pixel BR have the optimal light emitting efficiency in the low gray level region.

Figure 16:
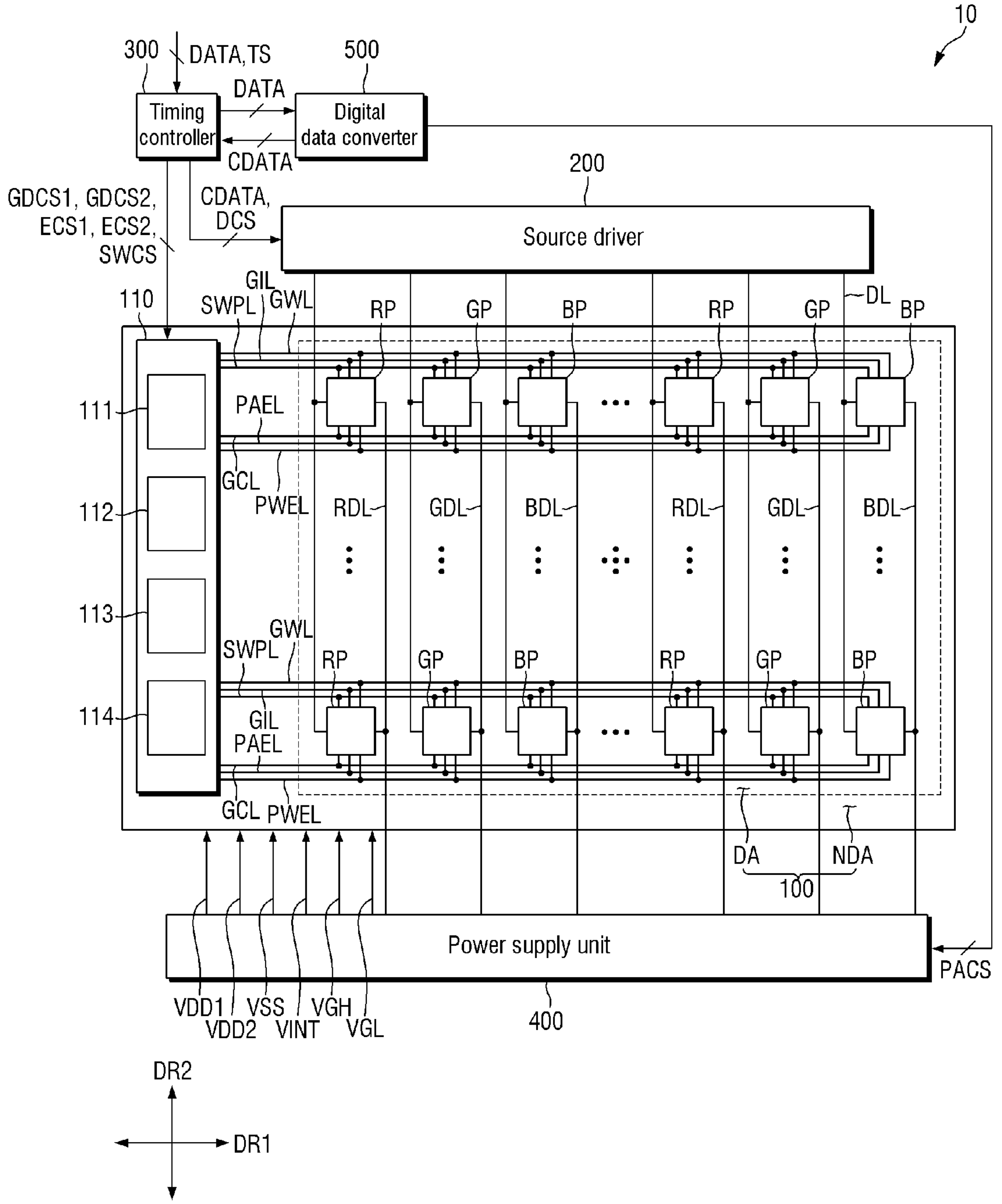
FIG. 16 is a block diagram showing a display device according to an embodiment.

FIG. 16 is a block diagram showing a display device according to an embodiment.

The embodiment of FIG. 16 is different from the embodiment of FIG. 1 in that a digital data converter 500 is added, and each of the first PAM data lines RDL, the second PAM data lines GDL, and the third PAM data lines BDL is connected to the power supply unit 400.

Referring to FIG. 16, the digital data converter 500 receives the digital video data DATA from the timing controller 300. The digital data converter 500 determines the digital video data corresponding to the low gray level region among the digital video data DATA. The low gray level region may be the black gray level region, and the high gray level region may include the gray level region and the white gray level region. For example, the black gray level region may correspond to gray levels between 0 and a first level, the gray level region may correspond to gray levels between the first level and a second level, and the white gray level region may correspond to gray levels between the second level and a maximum level. The digital data converter 500 may generate modulated digital data CDATA by lowering a value of the digital video data DATA corresponding to the low gray level region, and outputs the modulated digital data CDATA to the timing controller 300. The timing controller 300 outputs the modulated digital data CDATA and the source control signal DCS to the source driver 200, and the source driver 200 generates PWM data voltages in response to the modulated digital data CDATA and outputs the PWM data voltages to the PWM data lines DL.

Further, the digital data converter 500 outputs the PAM control signal corresponding to the low gray level region among PAM control signals PACS at a first level voltage, and outputs the PAM control signal corresponding to the high gray level region at a second level voltage.

The power supply unit 400 may individually apply the PAM data voltages to the first PAM data lines RDL, the second PAM data lines GDL, and the third PAM data lines BDL in response to the PAM control signal PACS. For example, the power supply unit 400 outputs any one of a first high PAM data voltage and a first low PAM data voltage to the first PAM data lines RDL in response to the PAM control signal PACS. The power supply unit 400 outputs any one of a second high PAM data voltage and a second low PAM data voltage to the second PAM data lines RDL in response to the PAM control signal PACS. The power supply unit 400 outputs any one of a third high PAM data voltage and a third low PAM data voltage to the third PAM data lines BDL in response to the PAM control signal PACS. In an embodiment, the first high PAM data voltage has a level higher than that of the first low PAM data voltage, the second high PAM data voltage has a level higher than that of the second low PAM data voltage, and the third high PAM data voltage has a level higher than that of the third low PAM data voltage.

The digital data converter 500 may be formed of an integrated circuit. Although FIG. 16 illustrates that the digital data converter 500 is formed as a separate component from the timing controller 300, the digital data converter 500 may be integrated into the timing controller 300. That is, the digital data converter 500 may be included in the timing controller 300.

Figure 17:
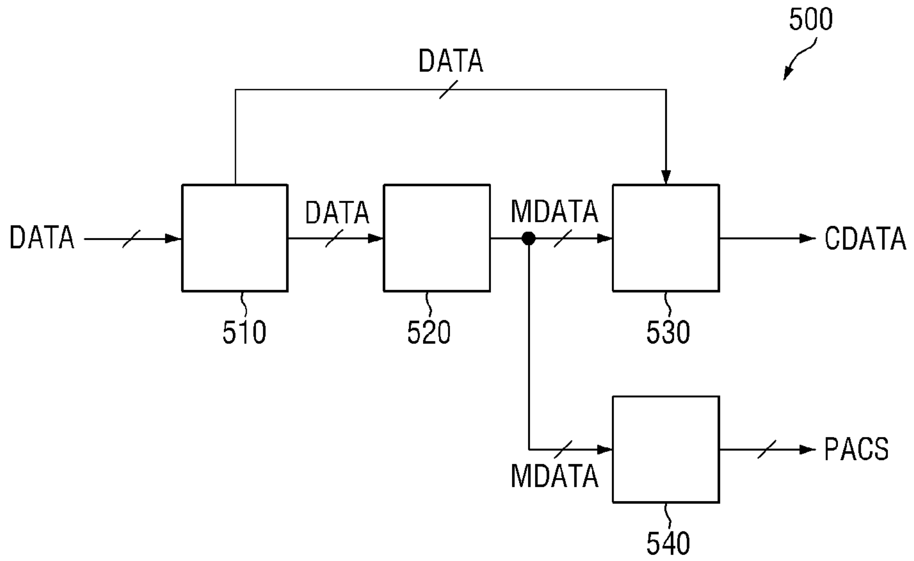
FIG. 17 is a block diagram showing in detail the digital data converter of FIG. 16.

FIG. 17 is a block diagram showing in detail the digital data converter of FIG. 16 according to an example embodiment.

Referring to FIG. 17, the digital data converter 500 may include a memory 510, a gray level determination unit 520 (e.g., a logic circuit), a data modulation unit 530 (e.g., a modulation circuit), and a PAM control signal output unit 540 (e.g., an output circuit).

The memory 510 may be a frame memory that stores the digital video data DATA corresponding to one frame period or a line memory that stores the digital video data DATA corresponding to one horizontal line or a plurality of horizontal lines. The digital video data DATA corresponding to one frame period indicates the digital video data DATA to be written in all the sub-pixels RP, GP, and BP of the display panel 100. The digital video data DATA corresponding to one horizontal line indicates the digital video data DATA to be written in the sub-pixels RP, GP, and BP disposed in one row of the display panel 100. The digital video data DATA of one horizontal line may include digital video data of first to $n^{th}$ columns C1 to Cn.

The gray level determination unit 520 may receive the digital video data DATA from the memory 510 on a horizontal line basis as shown in FIG. 18. As shown in FIG. 18, the gray level determination unit 520 may replace the digital video data DATA corresponding to the low gray level region among the digital video data DATA with 0, and may replace the digital video data DATA corresponding to the high gray level region with 1. FIG. 18 illustrates that the digital video data DATA is 8-bit digital data, and also illustrates the case in which the gray level is determined as the low gray level region when the digital video data is 63 or less and determined as the high gray level region when the digital video data is 64 or more, but embodiments of this specification are not limited thereto.

That is, the gray level determination unit 520 may generate low gray level map data MDATA in which the low gray level region and the high gray level region of the digital video data DATA are distinguished. The gray level determination unit 520 may output the low gray level map data MDATA to the data modulation unit 530 and the PAM control signal output unit 540.

The data modulation unit 530 may receive the digital video data DATA from the memory 510 on a horizontal line basis, and may receive the low gray level map data MDATA from the gray level determination unit 520 on a horizontal line basis. That is, the data modulation unit 530 may receive the digital video data DATA of a $k^{th}$ horizontal line from the memory 510, and may receive the low gray level map data MDATA of the $k^{th}$ horizontal line from the gray level determination unit 520 at the same time.

The data modulation unit 530 may perform up-modulation of the digital video data DATA corresponding to the low gray level region among the digital video data DATA based on the low gray level map data MDATA. That is, the data modulation unit 530 may increase a value of the digital video data DATA corresponding to the low gray level region among the digital video data DATA based on the low gray level map data MDATA. The data modulation unit 530 does not modulate the digital video data DATA corresponding to the high gray level region among the digital video data DATA.

For example, as shown in FIG. 18, the data modulation unit 530 may add "60" to the digital video data DATA having the same coordinates as those of the column having a value of "0" in the low gray level map data MDATA. Further, the data modulation unit 530 does not modulate the digital video data DATA having the same coordinates as the coordinates having a value of "1" in the low gray level map data MDATA.

The data modulation unit 530 may output the modulated digital video data CDATA generated by performing up-modulation of the digital video data DATA corresponding to the low gray level region to the timing controller 300.

The PAM control signal output unit 540 may receive the low gray level map data MDATA from the gray level determination unit 520 on a horizontal line basis. The PAM control signal output unit 540 may output the PAM control signal PACS for controlling the first PAM data voltage to be applied to each of the first PAM data lines RDL, the second PAM data voltage to be applied to each of the second PAM data lines GDL, and the third PAM data voltage to be applied to each of the third PAM data lines BDL based on the low gray level map data MDATA. The PAM control signal PACS will be described in detail with reference to FIG. 19.

Figure 19:
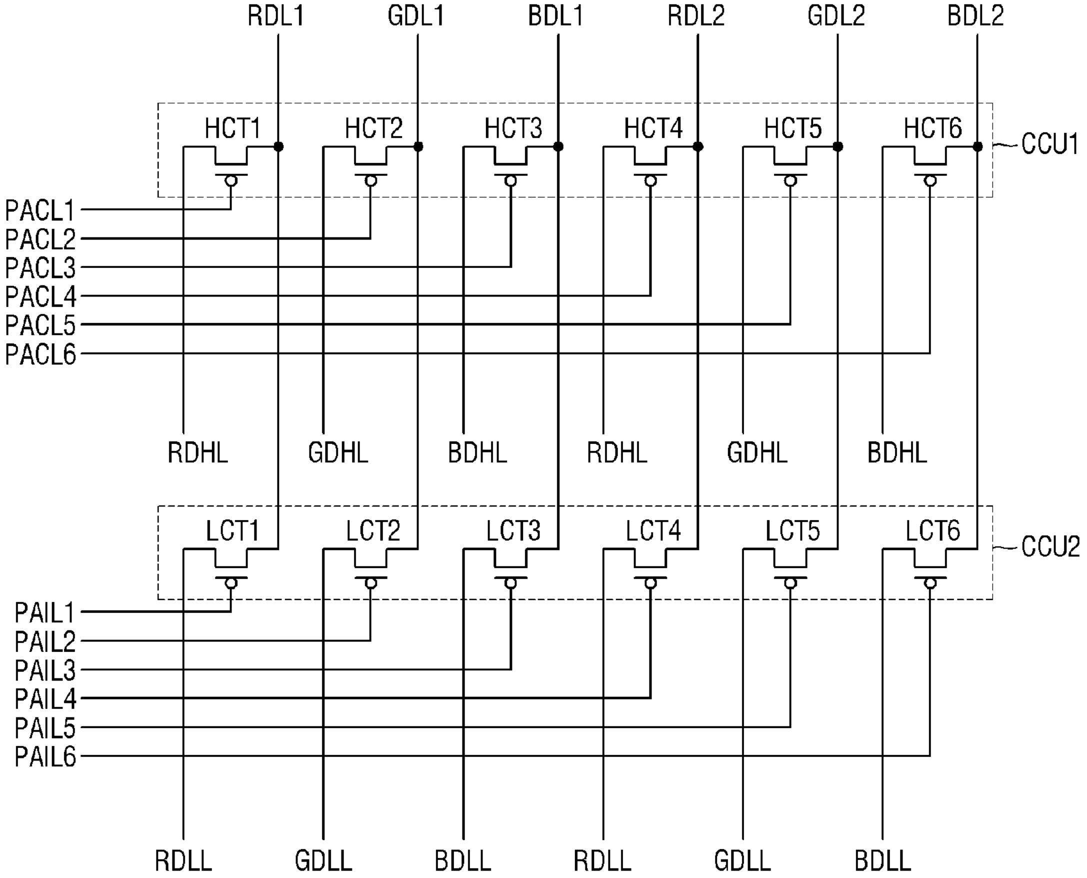
FIG. 19 is a circuit diagram showing in detail the power supply unit of FIG. 16.

FIG. 19 is a circuit diagram showing in detail the power supply unit of FIG. 16 according to an example embodiment.

Referring to FIG. 19, the power supply unit 400 includes a high connection controller CCU1 and a low connection controller CCU2. FIG. 19 illustrates six PAM data lines RDL1, RDL2, GDL1, GDL2, BDL1, and BDL2 for simplicity of description.

The high connection controller CCU1 controls a connection between the PAM data lines RDL1, RDL2, GDL1, GDL2, BDL1, and BDL2 and high PAM data voltage lines RDHL, GDHL, BDHL in response to first to sixth PAM control signals inputted to first to sixth PAM control lines PACL1 to PACL6. That is, the high connection controller CCU1 supplies high PAM data voltages of the high PAM data voltage lines RDHL, GDHL, and BDHL to the PAM data lines RDL1, RDL2, GDL1, GDL2, BDL1, and BDL2 in response to the first to sixth PAM control signals.

The high connection controller CCU1 may include first to sixth high connection transistors HCT1 to HCT6.

When a first PAM control signal of the first level voltage is inputted to the first PAM control line PACL1, the first high connection transistor HCT1 may connect a first PAM data line RDL1 to a first high PAM data voltage line RDHL. When a second PAM control signal of the first level voltage is inputted to the second PAM control line PACL2, the second high connection transistor HCT2 may connect a second PAM data line GDL1 to a second high PAM data voltage line GDHL. When a third PAM control signal of the first level voltage is inputted to the third PAM control line PACL3, the third high connection transistor HCT3 may connect a third PAM data line BDL1 to a third high PAM data voltage line BDHL.

When a fourth PAM control signal of the first level voltage is inputted to the fourth PAM control line PACL4, the fourth high connection transistor HCT4 may connect a first PAM data line RDL2 to the first high PAM data voltage line RDHL. When a fifth PAM control signal of the first level voltage is inputted to the fifth PAM control line PACL5, the fifth high connection transistor HCT5 may connect a second PAM data line GDL2 to the second high PAM data voltage line GDHL. When a sixth PAM control signal of the first level voltage is inputted to the sixth PAM control line PACL6, the sixth high connection transistor HCT6 may connect a third PAM data line BDL2 to the third high PAM data voltage line BDHL.

The high connection controller CCU1 controls connection between the PAM data lines RDL1, RDL2, GDL1, GDL2, BDL1, and BDL2 and the high PAM data voltage lines RDHL, GDHL, and BDHL in response to the first to sixth PAM control signals inputted to the first to sixth PAM control lines PACL1 to PACL6. That is, the high connection controller CCU1 supplies the high PAM data voltages of the high PAM data voltage lines RDHL, GDHL, and BDHL to the PAM data lines RDL1, RDL2, GDL1, GDL2, BDL1, and BDL2 in response to the first to sixth PAM control signals.

The low connection controller CCU2 may include first to sixth low connection transistors LCT1 to LCT6.

When a first PAM inversion signal of the first level voltage is inputted to a first PAM inversion line PAIL1, the first low connection transistor LCT1 may connect the first PAM data line RDL1 to a first low PAM data voltage line RDLL. When a second PAM inversion signal of the first level voltage is inputted to a second PAM inversion line PAIL2, the second low connection transistor LCT2 may connect the second PAM data line GDL1 to a second low PAM data voltage line GDLL. When a third PAM inversion signal of the first level voltage is inputted to a third PAM inversion line PAIL3, the third low connection transistor LCT3 may connect the third PAM data line BDL1 to a third low PAM data voltage line BDLL.

When a fourth PAM inversion signal of the first level voltage is inputted to a fourth PAM inversion line PAIL4, the fourth low connection transistor LCT4 may connect the first PAM data line RDL2 to the first low PAM data voltage line RDLL. When a fifth PAM inversion signal of the first level voltage is inputted to a fifth PAM inversion line PAIL5, the fifth low connection transistor LCT5 may connect the second PAM data line GDL2 to the second low PAM data voltage line GDLL. When a sixth PAM inversion signal of the first level voltage is inputted to a sixth PAM inversion line PAIL6, the sixth low connection transistor LCT6 may connect the third PAM data line BDL2 to the third low PAM data voltage line BDLL.

The PAM control signals PACS may include the first to sixth PAM control signals and the first to sixth PAM inversion signals. The first to sixth PAM inversion signals may be inverted signals of the first to sixth PAM control signals, respectively. For example, when the first PAM control signal has the first level voltage, the first PAM inversion signal may have the second level voltage. Further, when the first PAM control signal has the second level voltage, the first PAM inversion signal may have the first level voltage. The first level voltage may be the gate-on voltage for turning on the high connection transistors HCT1 to HCT6 and the low connection transistors LCT1 to LCT6. The second level voltage may be the gate-off voltage for turning off the high connection transistors HCT1 to HCT6 and the low connection transistors LCT1 to LCT6. The first level voltage may have a level lower than that of the second level voltage. Therefore, when the first PAM control signal is inputted, at least one of the first high connection transistor HCT1 and the first low connection transistor LCT1 may be turned on.

The PAM control signal output unit 540 may output the PAM control signals for controlling the PAM data voltages to be applied to the sub-pixels of the $k^{th}$ horizontal line at any one of the first level voltage and the second level voltage based on the low gray level map data MDATA of the $k^{th}$ horizontal line. For example, in the low gray level map data MDATA of the $k^{th}$ horizontal line, the first column C1, the second column C2, the $(n-1)^{th}$ column Cn−1, and the $n^{th}$ column Cn have a value of "0" indicating the low gray level region. Therefore, the PAM control signal output unit 540 may output the first PAM control signal corresponding to the first column C1, the second PAM control signal corresponding to the second column C2, the $(n-1)^{th}$ PAM control signal corresponding to the $(n-1)^{th}$ column Cn−1, and the $n^{th}$ PAM control signal corresponding to the $n^{th}$ column Cn at the first level voltage, and may output the PAM control signals corresponding to the remaining columns at the second level voltage.

Accordingly, among the first to sixth high connection transistors HCT1 to HCT6 illustrated in FIG. 19, the first and second high connection transistors HCT1 and HCT2 may be turned on by the first and second PAM control signals of the first level voltage. Further, among the first to sixth low connection transistors LCT1 to LCT6 illustrated in FIG. 19, the third to sixth low connection transistors LCT3 to LCT6 may be turned on by the third to sixth PAM inversion signals of the first level voltage. Therefore, among the six PAM data lines RDL1, RDL2, GDL1, GDL2, BDL1, and BDL2 illustrated in FIG. 19, the first high PAM data voltage of the first high PAM data voltage line RDHL may be applied to the first PAM data line RDL1, and the second high PAM data voltage of the second high PAM data voltage line GDHL may be applied to the second PAM data line GDL1. On the contrary, among the six PAM data lines RDL1, RDL2, GDL1, GDL2, BDL1, and BDL2, the first low PAM data voltage of the first low PAM data voltage line RDLL may be applied to the first PAM data line RDL2, the second low PAM data voltage of the second low PAM data voltage line GDLL may be applied to the second PAM data line GDL2, and the third low PAM data voltage of the third low PAM data voltage line BDLL may be applied to each of the third PAM data lines BDL1 and BDL2.

Figure 20:
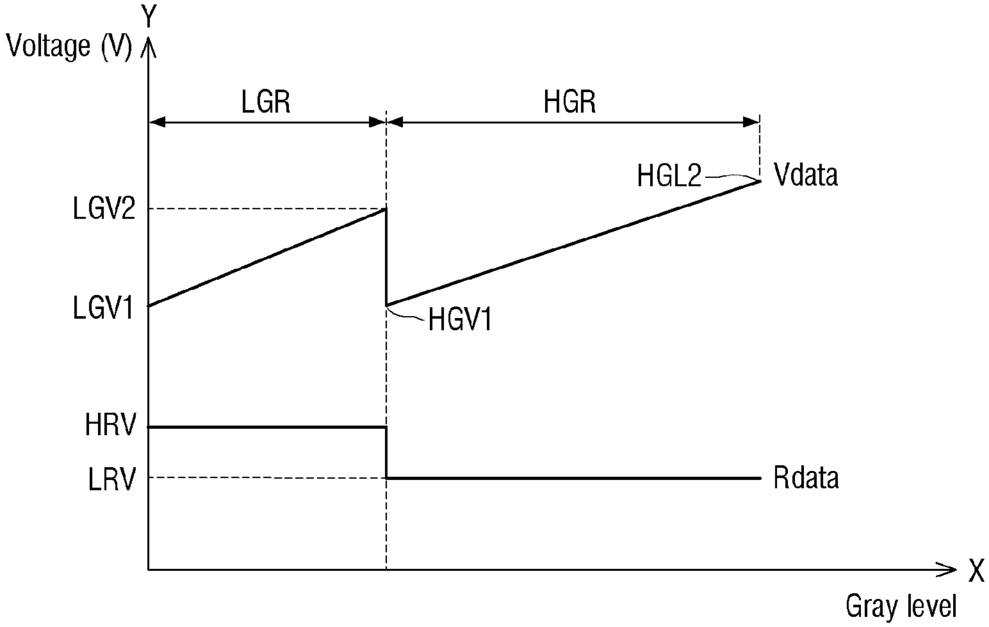
FIG. 20 is a graph showing an example of the PWM data voltage of the $j^{th}$ PWM data line and the first PAM data voltage according to the gray level.

FIG. 20 is a graph showing another example of the PWM data voltage of the $j^{th}$ PWM data line and the first PAM data voltage according to the gray level. In FIG. 20, the X-axis represents a gray level to be emitted by the first sub-pixel RP, and the Y-axis represents a voltage.

Referring to FIG. 20, since the digital data converter 500 generates the modulated digital data CDATA by performing up-modulation of the digital video data DATA in the low gray level region, the PWM data voltage Vdata of the $j^{th}$ PWM data line DLj does not increase linearly in a low gray level region LGR and a high gray level region HGR. For example, the PWM data voltage Vdata may be cut off in a boundary of the low gray level region LGR and the high gray level region HGR. Specifically, the PWM data voltage Vdata may increase linearly from a first low gray level voltage LGV1 to a second low gray level voltage LGV2 in the low gray level region LGR. Further, the PWM data voltage Vdata may increase linearly from a first high gray level voltage HGV1 to a second high gray level voltage HGV2 in the high gray level region HGR. In this case, the first high gray level voltage HGV1 may be lower than the second low gray level voltage LGV2.

Further, the first PAM data voltage Rdata has a first high PAM data voltage HRV in the low gray level region LGR, and has a first low PAM data voltage LRV in the high gray level region HGR. The first high PAM data voltage HRV may be higher than the first low PAM data voltage LRV. The voltage of the gate electrode of the eighth transistor T8 may be higher when the first sub-pixel RP emits a light corresponding to the gray level of the low gray level region LGR than when the first sub-pixel RP emits a light corresponding to the gray level of the high gray level region HGR. Therefore, the peak current value of the driving current Ids flowing through the eighth transistor T8 may be lower when the first sub-pixel RP emits a light corresponding to the gray level of the low gray level region LGR than when the first sub-pixel RP emits a light corresponding to the gray level of the high gray level region HGR.

Figure 21:
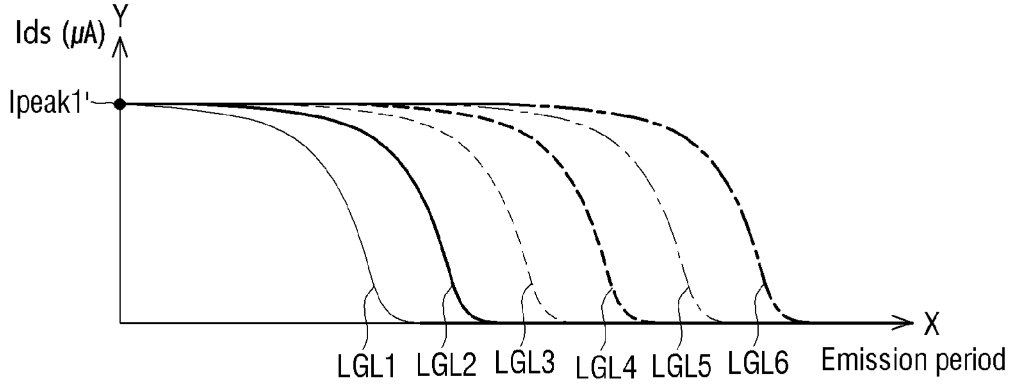
FIG. 21 is a waveform diagram illustrating an emission period in response to a driving current in a low gray level region according to an embodiment.
Figure 22:
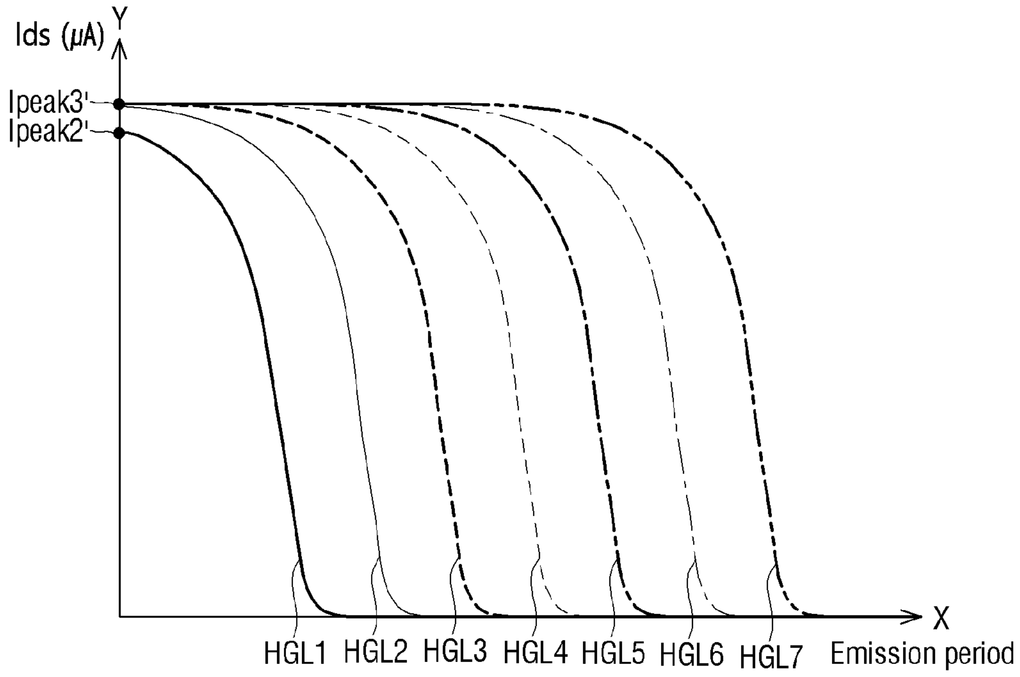
FIG. 22 is a waveform diagram illustrating an emission period in response to a driving current in a high gray level region according to an embodiment.

FIG. 21 is a waveform diagram illustrating an emission period in response to a driving current in a low gray level region according to an embodiment. FIG. 22 is a waveform diagram illustrating an emission period in response to a driving current in a high gray level region according to an embodiment.

In FIGS. 21 and 22, the X-axis represents the period in which the driving current Ids is applied to the light emitting element EL, i.e., the emission period of the light emitting element EL, and the Y-axis represents the magnitude of the driving current Ids. FIG. 21 shows the period in which the driving current Ids is applied to the light emitting element LE in each of first to sixth low gray levels LGL1 to LGL6. FIG. 22 shows the period in which the driving current Ids is applied to the light emitting element LE, i.e., the emission period of the light emitting element LE, in each of the first to seventh high gray levels HGL1 to HGL7.

Referring to FIGS. 21 and 22, the driving current Ids may have a first peak current value Ipeak1' at each of the first to sixth low gray levels LGL1 to LGL6, the driving current Ids may have a second peak current value Ipeak2' at the first high gray level HGL1, and the driving current Ids may have a third peak current value Ipeak3' higher than the second peak current value Ipeak2' at each of the second to seventh high gray levels HGL2 to HGL7. The difference between the second peak current value Ipeak2' and the third peak current value Ipeak3' may be very small. The first peak current value Ipeak1' may be lower than the second peak current value Ipeak2'.

As shown in FIGS. 21 and 22, it is possible to make the peak current value of the driving current Ids constant or to reduce variation in the peak current value in the low gray level region by increasing the period in which the driving current Ids is applied to the light emitting element EL instead of lowering the magnitude of the peak current value of the driving current Ids in the low gray level region. Therefore, it is possible to prevent or reduce the change in color coordinates of the image displayed by the display panel 100 in the low gray level region due to the variation in the peak current value of the driving current Ids in the low gray level region. Further, it is possible to prevent or reduce the variation in the light emitting efficiency of the light emitting element of the first sub-pixel RP, the light emitting efficiency of the light emitting element of the second sub-pixel GP, and the light emitting efficiency of the light emitting element of the third sub-pixel BP depending on the driving current Ids in the low gray level region.

Figure 23:
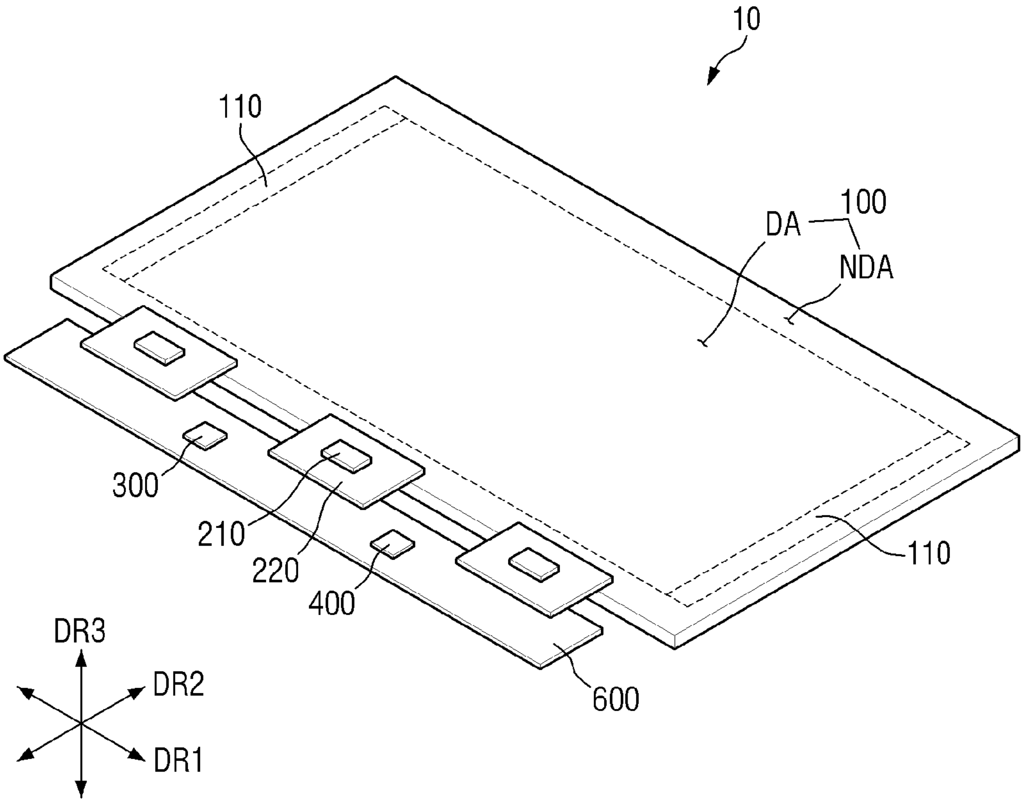
FIG. 23 is a perspective view illustrating a display device according to an embodiment.

FIG. 23 is a perspective view illustrating a display device according to an embodiment.

Referring to FIG. 23, the display device 10 is a device for displaying a moving image or a still image. The display device 10 may be used as a display screen of various devices, such as a television, a laptop computer, a monitor, a billboard and an Internet-of-Things (IOT) device, as well as portable electronic devices such as a mobile phone, a smartphone, a tablet personal computer (PC), a smart watch, a watch phone, a mobile communication terminal, an electronic notebook, an electronic book, a portable multimedia player (PMP), a navigation device and an ultra-mobile PC (UMPC).

The display device 10 includes the display panel 100, a plurality of source driving circuits 210, and a plurality of source circuit boards 220.

The display panel 100 may be formed in a rectangular shape, in plan view, having long sides in a first direction (X-axis direction) and short sides in a second direction (Y-axis direction) crossing the first direction (X-axis direction). The corner where the long side in the first direction (X-axis direction) and the short side in the second direction (Y-axis direction) meet may be rounded to have a predetermined curvature or may be right-angled. The planar shape of the display panel 100 is not limited to the rectangular shape, and may be formed in another polygonal shape, a circular shape or an elliptical shape. The display panel 100 may be formed to be flat, but is not limited thereto. For example, the display panel 100 may include a curved portion formed at left and right ends and having a predetermined curvature or a varying curvature. In addition, the display panel 100 may be formed flexibly so that it can be curved, bent, folded, or rolled.

The display panel 100 may include a display area DA displaying an image and a non-display area NDA disposed around the display area DA. The display area DA may occupy most of the area of the display panel 100. The display area DA may be disposed at the center of the display panel 100. The sub-pixels RP, GP, and BP may be disposed in the display area DA to display an image. Each of the sub-pixels RP, GP, and BP may include an inorganic light emitting element including an inorganic semiconductor as a light emitting element that emits light.

The non-display area NDA may be disposed adjacent to the display area DA. The non-display area NDA may be an area outside the display area DA. The non-display area NDA may be disposed to surround the display area DA. The non-display area NDA may be an edge area of the display area DA.

The scan driver 110 may be disposed in the non-display area NDA. Although the case in which the scan driver 110 is disposed on both sides of the display area DA, e.g., on the left side and the right side of the display area DA has been illustrated, embodiments of the present specification are not limited thereto. The scan driver 110 may be disposed on one side of the display area DA.

Further, display pads may be arranged in the non-display area NDA to be connected to the plurality of source circuit boards 220. The display pads may be disposed on one side edge of the display panel 100. For example, the display pads may be disposed on the lower edge of the display panel 100.

The plurality of source circuit boards 220 may be disposed on the display pads disposed on one side edge of the display panel 100. The plurality of source circuit boards 220 may be attached to the display pads using a conductive adhesive member such as an anisotropic conductive film. Accordingly, the plurality of source circuit boards 220 may be electrically connected to the signal lines of the display panel 100. The plurality of source circuit boards 220 may each be a flexible printed circuit board, a printed circuit board, or a flexible film such as a chip on film.

The source driver 200 may include the plurality of source driving circuits 210. The plurality of source driving circuits 210 may generate data voltages and supply the data voltages to the display panel 100 through the plurality of source circuit boards 220.

Each of the plurality of source driving circuits 210 may be formed of an integrated circuit (IC) and attached to the plurality of source circuit boards 220. Alternatively, the plurality of source driving circuits 210 may be attached onto the display panel 100 by a chip on glass (COG) method, a chip on plastic (COP) method, or an ultrasonic bonding method.

A control circuit board 600 may be attached to the plurality of source circuit boards 220 through a conductive adhesive member such as an anisotropic conductive film. The control circuit board 600 may be electrically connected to the plurality of source circuit boards 220. The control circuit board 600 may be a flexible printed circuit board or a printed circuit board.

Each of the timing controller 300 and the power supply unit 400 may be formed as an integrated circuit (IC) and attached to the control circuit board 600. The timing controller 300 may supply digital video data DATA and timing signals TS to the plurality of source driving circuits 210. The power supply unit 400 may generate and output voltages for driving the sub-pixels of the display panel 100 and the plurality of source driving circuits 210.

Figure 24:
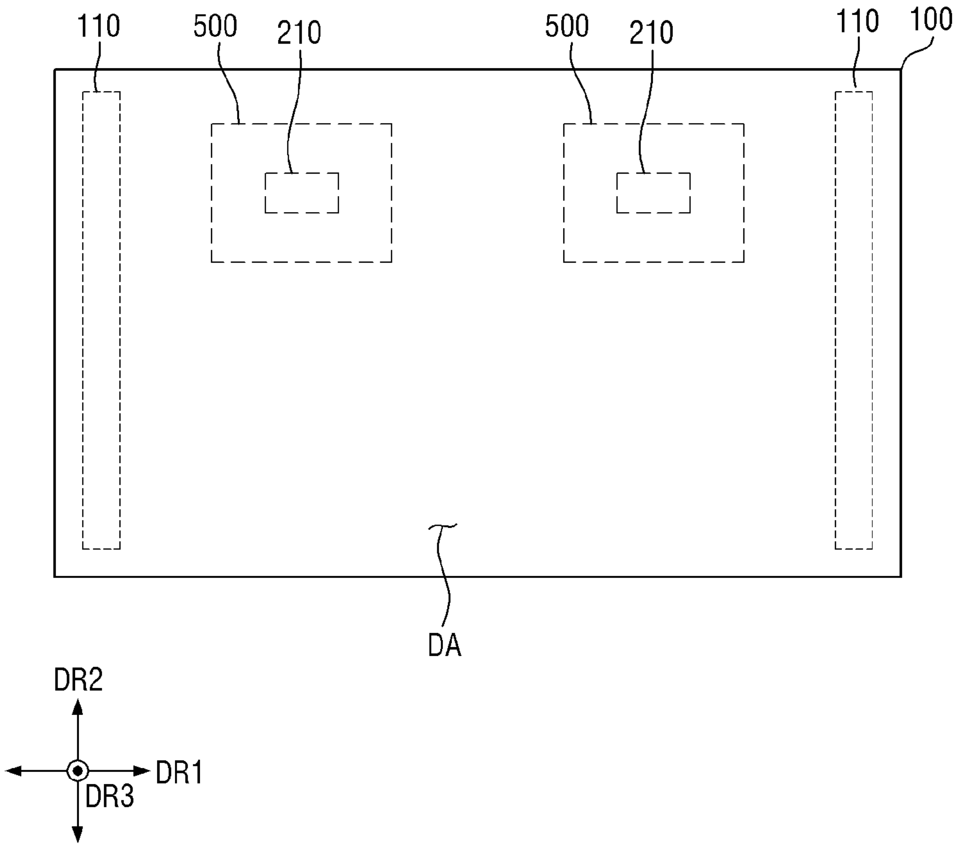
FIG. 24 is a plan view illustrating a display device according to an embodiment.

FIG. 24 is a plan view illustrating a display device according to an embodiment.

The embodiment of FIG. 24 is different from the embodiment of FIG. 23 in that the display panel 100 does not include the non-display area NDA, the scan driver 110 is disposed in the display area DA, and the plurality of source circuit boards 220 on which the source driver circuit 210 is mounted is disposed on the rear surface of the display panel 100. In FIG. 24, the differences from the embodiment of FIG. 23 will be mainly described.

Referring to FIG. 24, the scan driver 110 may be disposed in the display area DA. The scan driver 110 does not overlap the sub-pixels RP, GP, and BP, and may be disposed between the sub-pixels RP, GP, and BP.

The plurality of source circuit boards 220 may be disposed on the rear surface of the display panel 100. In this case, the display pads connected to the plurality of source circuit boards 220 may be disposed on the rear surface of the display panel 100. Further, pad connection electrodes respectively connected to the display pads while penetrating the display panel 100 may be disposed in the display area DA of the display panel 100.

Figure 25:
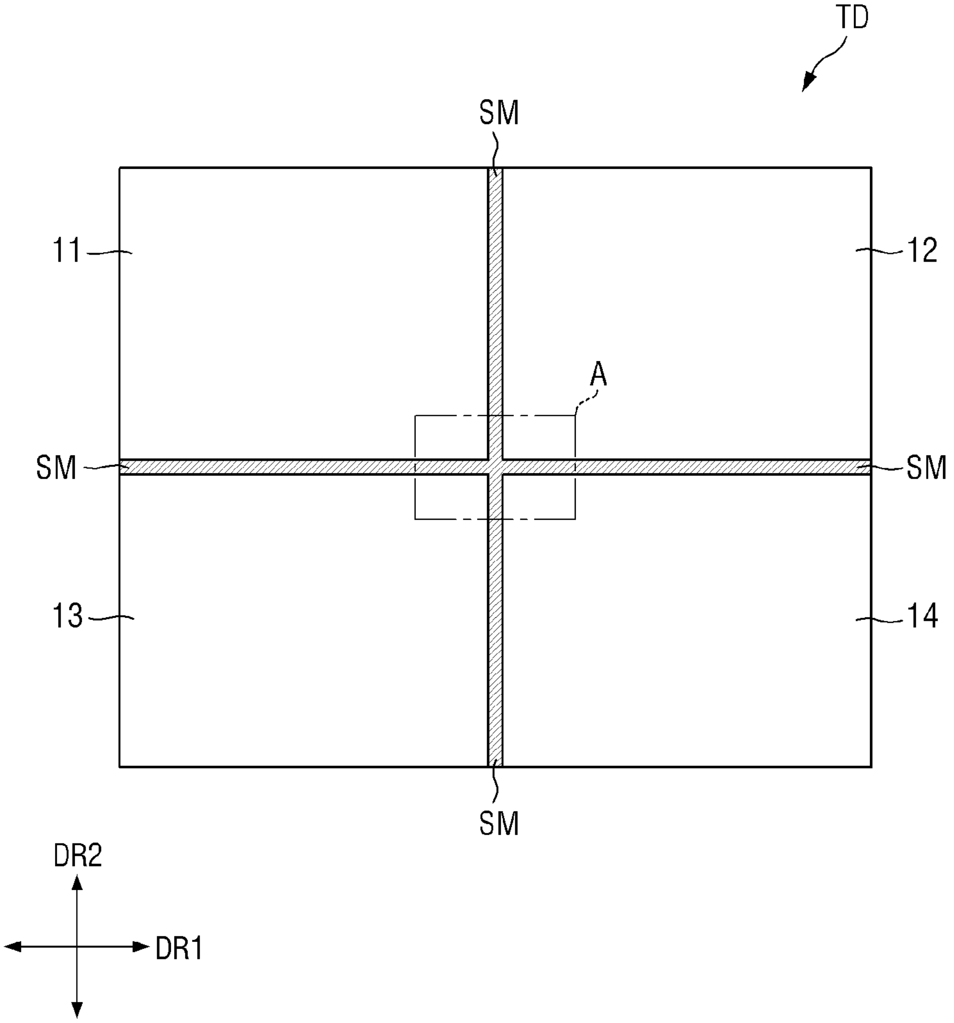
FIG. 25 is a plan view illustrating a tiled display device including the display device shown in FIG. 24.

FIG. 25 is a plan view illustrating a tiled display device including the display device shown in FIG. 24.

Referring to FIG. 25, a tiled display device TD may include a plurality of display devices 11, 12, 13, and 14. For example, the tiled display device TD may include a first display device 11, a second display device 12, a third display device 13, and a fourth display device 14.

The plurality of display devices 11, 12, 13, and 14 may be arranged in a grid shape. For example, the first display device 11 and the second display device 12 may be disposed in the first direction DR1. The first display device 11 and the third display device 13 may be disposed in the second direction DR2. The third display device 13 and the fourth display device 14 may be disposed in the first direction DR1. The second display device 12 and the fourth display device 14 may be disposed in the second direction DR2.

The number and arrangement of the plurality of display devices 11, 12, 13, and 14 in the tiled display device TD are not limited to those illustrated in FIG. 25. The number and arrangement of the display devices 11, 12, 13, and 14 in the tiled display device TD may be determined by the sizes of the display device 10 and the tiled display device TD and the shape of the tiled display device TD.

The plurality of display devices 11, 12, 13, and 14 may have the same size, but the present disclosure is not limited thereto. For example, the plurality of display devices 11, 12, 13, and 14 may have different sizes.

Each of the plurality of display devices 11, 12, 13, and 14 may have a rectangular shape including long sides and short sides. The plurality of display devices 11, 12, 13, and 14 may be disposed such that the long sides or the short sides thereof are connected to each other. Some or all of the plurality of display devices 11, 12, 13, and 14 may be disposed at the edge of the tiled display device TD, and may form one side of the tiled display device TD. At least one of the plurality of display devices 11, 12, 13, and 14 may be disposed on least one corner of the tiled display device TD, and may form two adjacent sides of the tiled display device TD. At least one of the plurality of display devices 11, 12, 13, and 14 may be surrounded by other display devices.

The tiled display device TD may include a seam SM disposed between the plurality of display devices 11, 12, 13, and 14. For example, the seam SM may be disposed between the first display device 11 and the second display device 12, between the first display device 11 and the third display device 13, between the second display device 12 and the fourth display device 14, and between the third display device 13 and the fourth display device 14.

The seam SM may include a coupling member or an adhesive member. In this case, the plurality of display devices 11, 12, 13, and 14 may be connected to each other by the coupling member or the adhesive member of the seam SM. For example, the coupling member or the adhesive member may have a cross shape in an area A of the tiled display device TD.

When the scan driver 110 is disposed in the display area DA and the plurality of source circuit boards 220 are disposed on the rear surface of the display panel 100 as shown in FIG. 25, the non-display areas NDA in which the sub-pixels RP, GP, and BP are not disposed may be omitted in each of the plurality of display devices 11, 12, 13 and 14, which makes it possible to minimize or prevent the seam SM from being visually recognized in the tiled display device TD. Therefore, it is possible to improve a sense of immersion in an image of the tiled display device by allowing the images of the plurality of display devices 11, 12, 13, and 14 to be viewed without disconnection despite the seam SM.

While the present disclosure has been particularly shown and described with reference to embodiments thereof, it will be understood by those of ordinary skill in the art that various changes in form and detail may be made therein without departing from the spirit and scope of the present disclosure as defined by the following claims. The embodiments of the present disclosure described herein should be considered in a descriptive sense only and not for purposes of limitation.

What is claimed is:

1. A display device comprising:

pulse-amplitude modulation (PAM) data lines configured to receive PAM data voltages, respectively;

pulse-width modulation (PWM) data lines configured to receive PWM data voltages, respectively; and a plurality of sub-pixels respectively connected to the PWM data lines and the PAM data lines, and wherein each of the plurality of sub-pixels is configured to generate a driving current according to one PAM data voltage of the PAM data voltages and one PWM data voltage of the PWM data voltages, and emit a light emitting element according to the driving current, and wherein a peak current value of the driving current when the sub-pixel is configured to emit the light emitting element corresponding to a low gray level region is smaller than a peak current value of the driving current when the sub-pixel is configured to emit the light emitting element corresponding to a high gray level region higher than the low gray level region.

2. The display device of claim 1, wherein the low gray level region is a black gray level region, and the high gray level region includes a gray level region and a white gray level region.

3. The display device of claim 1, wherein the one PWM data voltage rises from a first low gray level voltage to a second low gray level voltage in the low gray level region, and rises from a first high gray level voltage to a second high gray level voltage in the high gray level region.

4. The display device of claim 3, wherein the second low gray level voltage is greater than the first low gray level voltage, and wherein the second high gray level voltage is greater than the first high gray level voltage.

5. The display device of claim 3, wherein the one PAM data voltage has a high PAM data voltage in the low gray level region and has a low PAM data voltage lower than the high PAM data voltage in the high gray level region.

6. The display device of claim 5, wherein the high PAM data voltage is lower than the first low gray level voltage or the second low gray level voltage.

7. The display device of claim 2, wherein each of the plurality of sub-pixels is configured to generate a control current according to one of the PAM data voltages, generate the driving current according to one of the PWM data voltages, and adjust a period during which the driving current is supplied to a light emitting element according to a voltage of a first node controlled by the control current.

8. The display device of claim 7, further comprising:

a sweep signal line configured to receive a sweep signal, and wherein the sweep signal comprises a plurality of sweep pulses generated during one frame period, and wherein each of the sweep pulses linearly changes from a gate-off voltage to a gate-on voltage.

9. The display device of claim 8, wherein a period during which the control current is supplied to a third node in the black gray level region is longer than a period during which the control current is applied to the third node in the gray level region.

10. The display device of claim 9, wherein the period during which the control current is supplied to the third node in the gray level region is longer than a period during which the control current is applied to the third node in the white level region.

11. The display device of claim 9, further comprising:

a scan write line configured to receive a scan write signal;

a scan initialization line configured to receive a scan initialization signal;

a scan control line configured to receive a scan control signal;

an initialization voltage line configured to receive an initialization voltage; and a first power line configured to receive a first power supply voltage, wherein each of the plurality of sub-pixels comprises:

a first transistor that is configured to generate the control current according to the first data voltage;

a second transistor that is configured to apply the first data voltage of the first data line to a first electrode of the first transistor according to the scan write signal;

a third transistor that is configured to apply the initialization voltage of the initialization voltage line to a gate electrode of the first transistor according to the scan initialization signal;

a fourth transistor that is configured to connect the gate electrode and a second electrode of the first transistor according to the scan write signal;

a fifth transistor that is configured to connect the first power line to the first electrode of the first transistor according to an PWM emission signal;

a sixth transistor that is configured to connect the second electrode of the first transistor to the third node according to the PWM emission signal;

a seventh transistor that is configured to connect the sweep signal line to a gate-off voltage line according to the scan control signal; and a first capacitor between the sweep signal line and the gate electrode of the first transistor.

12. The display device of claim 11, further comprising:

a second power line configured to receive a second power supply voltage; and an initialization voltage line configured to receive an initialization voltage, wherein each of the plurality of sub-pixels further comprises:

an eighth transistor that is configured to generate the driving current according to the second data voltage;

a ninth transistor that is configured to apply the second data voltage of the second data line to a first electrode of the eighth transistor according to the scan write signal;

a tenth transistor that is configured to apply the initialization voltage of the initialization voltage line to a gate electrode of the eighth transistor according to the scan initialization signal;

an eleventh transistor that is configured to connect the gate electrode and a second electrode of the eighth transistor according to the scan write signal;

a twelfth transistor that is configured to connect the second power line to a first electrode of the ninth transistor according to the PWM emission signal;

a thirteenth transistor that is configured to connect the first power line to a second node according to the scan control signal;

a fourteenth transistor that is configured to connect the second power line to the second node according to the PWM emission signal; and a second capacitor between a gate electrode of the eighth transistor and the second node.

13. The display device of claim 12, further comprising:

a third power line configured to receive a third power supply voltage, wherein each of the plurality of sub-pixels further comprises:

a fifteenth transistor that comprises a gate electrode connected to the third node;

a sixteenth transistor that is configured to connect the third node to the initialization voltage line according to the scan control signal;

a seventeenth transistor that is configured to connect a second electrode of the fifteenth transistor to a first electrode of the light emitting element according to a PAM emission signal;

an eighteenth transistor that is configured to connect the first electrode of the light emitting element to the initialization voltage line according to the scan control signal; and a third capacitor between the third node and the initialization voltage line.

14. The display device of claim 1, wherein the light emitting element is a flip chip type micro light emitting diode element.

15. A display device comprising:

pulse-amplitude modulation (PAM) data lines configured to receive PAM data voltages, respectively;

pulse-width modulation (PWM) data lines configured to receive PWM data voltages, respectively; and a plurality of sub-pixels respectively connected to the PWM data lines and the PAM data lines, and wherein each of the plurality of sub-pixels is configured to generate a driving current according to one PAM data voltage of the PAM data voltages and one PWM data voltage of the PWM data voltages, and emit a light emitting element according to the driving current, and wherein the one PWM data voltage rises from a first low gray level voltage to a second low gray level voltage in a low gray level region, and rises from a first high gray level voltage to a second high gray level voltage in a high gray level region.

16. The display device of claim 15, wherein the low gray level region is a black gray level region, and the high gray level region includes a gray level region and a white gray level region.

17. The display device of claim 15, wherein the second low gray level voltage is greater than the first low gray level voltage, and wherein the second high gray level voltage is greater than the first high gray level voltage.

18. The display device of claim 15, wherein the one PAM data voltage has a high PAM data voltage in the low gray level region and has a low PAM data voltage lower than the high PAM data voltage in the high gray level region.

19. The display device of claim 18, wherein the high PAM data voltage is lower than the first low gray level voltage or the second low gray level voltage.

20. The display device of claim 15, wherein each of the plurality of sub-pixels is configured to generate a control current according to one of the PAM data voltages, generate the driving current according to one of the PWM data voltages, and adjust a period during which the driving current is supplied to the light emitting element according to a voltage of a first node controlled by the control current.

21. The display device of claim 15, wherein the light emitting element is a flip chip type micro light emitting diode element.

22. A display device comprising:

pulse-amplitude modulation (PAM) data lines configured to receive PAM data voltages, respectively;

pulse-width modulation (PWM) data lines configured to receive PWM data voltages, respectively; and a plurality of sub-pixels respectively connected to the PWM data lines and the PAM data lines, and wherein each of the plurality of sub-pixels is configured to generate a driving current according to one PAM data voltage of the PAM data voltages and one PWM data voltage of the PWM data voltages, and emit a light emitting element according to the driving current, and wherein the one PAM data voltage has a high PAM data voltage in a low gray level region and has a low PAM data voltage lower than the high PAM data voltage in a high gray level region.

23. The display device of claim 22, wherein the low gray level region is a black gray level region, and the high gray level region includes a gray level region and a white gray level region.

24. The display device of claim 22, wherein the one PWM data voltage rises from a first low gray level voltage to a second low gray level voltage in the low gray level region, and rises from a first high gray level voltage to a second high gray level voltage in the high gray level region.

25. The display device of claim 24, wherein the second low gray level voltage is greater than the first low gray level voltage, and wherein the second high gray level voltage is greater than the first high gray level voltage.

26. The display device of claim 24, wherein the high PAM data voltage is lower than the first low gray level voltage or the second low gray level voltage.

27. The display device of claim 22, wherein each of the plurality of sub-pixels is configured to generate a control current according to one of the PAM data voltages, generate the driving current according to one of the PWM data voltages, and adjust a period during which the driving current is supplied to the light emitting element according to a voltage of a first node controlled by the control current.

28. The display device of claim 22, wherein the light emitting element is a flip chip type micro light emitting diode element.

* * * * *